(12) United States Patent
Ehrlich

(10) Patent No.: US 6,992,855 B2
(45) Date of Patent: Jan. 31, 2006

(54) METHODS FOR LIMITING CHANNEL CONTROL VALUES TO THEREBY IMPROVE SERVO-DEMODULATION ROBUSTNESS

(75) Inventor: Richard M. Ehrlich, Saratoga, CA (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 103 days.

(21) Appl. No.: 10/665,226

(22) Filed: Sep. 18, 2003

(65) Prior Publication Data

US 2005/0063087 A1 Mar. 24, 2005

(51) Int. Cl.
*G11B 5/09* (2006.01)
(52) U.S. Cl. .................... 360/77.08; 360/29; 360/39; 360/40; 360/78.14; 360/53; 360/49; 360/48
(58) Field of Classification Search ............... 360/65, 360/48–49, 53, 46, 67, 57, 77.08, 78.14
See application file for complete search history.

(56) References Cited

U.S. PATENT DOCUMENTS

| | | | |
|---|---|---|---|
| 4,188,646 A * | 2/1980 | Sordello et al. ......... 360/77.08 |
| 4,271,519 A | 6/1981 | Hall | |
| 5,050,016 A | 9/1991 | Squires | |
| 5,170,299 A | 12/1992 | Moon | |
| 5,255,136 A | 10/1993 | Machado et al. | |
| 5,384,671 A | 1/1995 | Fisher | |
| 5,420,730 A | 5/1995 | Moon et al. | |
| 5,477,103 A * | 12/1995 | Romano et al. ......... 360/77.08 |
| 5,544,135 A | 8/1996 | Akin, Jr. et al. | |
| 5,585,975 A * | 12/1996 | Bliss ........................ 360/65 |
| 5,706,265 A | 1/1998 | Bang | |
| 5,796,535 A | 8/1998 | Tuttle et al. | |
| 5,903,410 A | 5/1999 | Blaum et al. | |
| 5,963,387 A | 10/1999 | Son | |
| 5,966,258 A * | 10/1999 | Bliss ........................ 360/46 |
| 6,021,012 A | 2/2000 | Bang | |
| 6,108,153 A * | 8/2000 | Glover ...................... 360/51 |
| 6,111,710 A | 8/2000 | Feyh et al. | |
| 6,122,131 A | 9/2000 | Jeppson | |
| 6,155,199 A | 12/2000 | Chen et al. | |
| 6,181,505 B1 | 1/2001 | Sacks et al. | |
| 6,392,831 B1 | 5/2002 | Yeo et al. | |
| 6,483,789 B1 | 11/2002 | Kubota et al. | |
| 6,487,032 B1 * | 11/2002 | Cloke et al. ............... 360/51 |
| 6,504,663 B2 * | 1/2003 | Hirano et al. ............. 360/48 |
| 6,525,615 B1 | 2/2003 | Masenas et al. | |
| 6,545,836 B1 | 4/2003 | Ioannou | |
| 6,594,103 B1 | 7/2003 | Despain | |
| 6,678,110 B2 * | 1/2004 | Ellis ........................ 360/77.08 |
| 6,680,807 B1 | 1/2004 | She et al. | |
| 6,754,019 B2 | 6/2004 | Tokizono et al. | |
| 6,760,173 B2 | 7/2004 | Kuki et al. | |
| 6,816,013 B2 * | 11/2004 | Kao ........................ 330/279 |

(Continued)

OTHER PUBLICATIONS

Abramovitch et al., Customizable Coherent Servo Demodulation for Disk Drives, Sep. 1998, IEEE/ASME Transactions on Mechatronics, vol. No. 3, pp. 184-193.*

*Primary Examiner*—David Hudspeth
*Assistant Examiner*—Natalia Figueroa
(74) *Attorney, Agent, or Firm*—Fliesler Meyer LLP

(57) ABSTRACT

Methods are provided for limiting channel control values, such as servo automatic gain control (AGC) values and/or servo phase lock loop (PLL) values, within respective desired ranges. Keeping such values within desired ranges improves servo demodulation robustness.

28 Claims, 17 Drawing Sheets

U.S. PATENT DOCUMENTS

| | | |
|---|---|---|
| 2003/0026017 A1 | 2/2003 | Chong et al. |
| 2003/0026363 A1 | 2/2003 | Stoter et al. |
| 2004/0125479 A1 | 7/2004 | Ehrlich |
| 2004/0125481 A1 | 7/2004 | Ehrlich |
| 2004/0125482 A1 | 7/2004 | Ehrlich |
| 2004/0125483 A1 | 7/2004 | Ehrlich |
| 2004/0125484 A1 | 7/2004 | Ehrlich |
| 2004/0125485 A1 | 7/2004 | Ehrlich |
| 2005/0013026 A1 | 1/2005 | Ehrlich |
| 2005/0013027 A1 | 1/2005 | Ehrlich |
| 2005/0013031 A1 | 1/2005 | Ehrlich |
| 2005/0063088 A1 * | 3/2005 | Ehrlich .................... 360/77.08 |

* cited by examiner

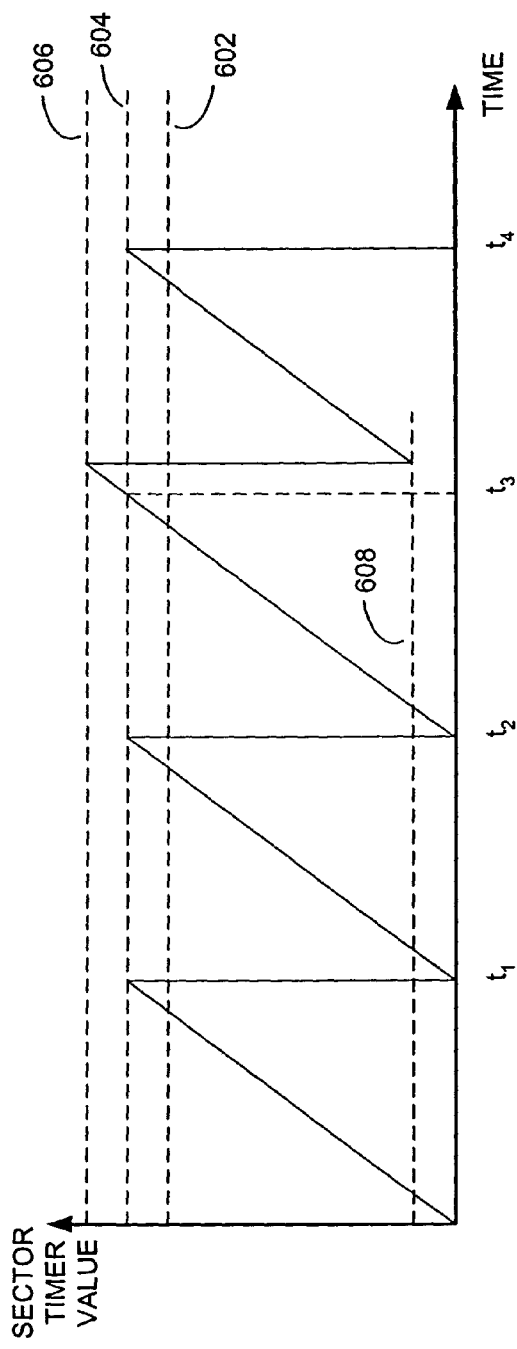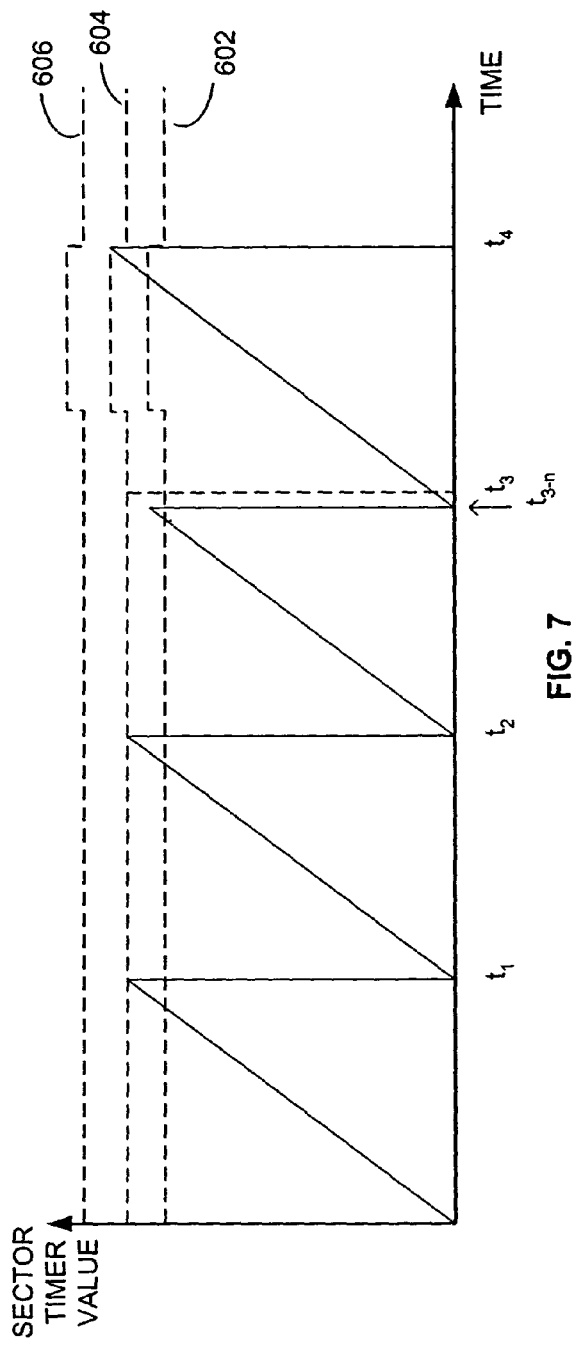

METHODS FOR LIMITING CHANNEL CONTROL VALUES TO THEREBY IMPROVE SERVO-DEMODULATION ROBUSTNESS

CROSS REFERENCE TO RELATED APPLICATIONS

This application relates to the following commonly invented and commonly assigned applications, each of which was filed on Apr. 14, 2003: U.S. patent application Ser. No. 10/413,316, entitled "Systems for Improving Servo Demodulation Robustness"; U.S. patent application Ser. No. 10/412,853, entitled "Systems for Detecting Multiple Occurrences of a SAM Pattern to Thereby Improve Servo-Demodulation Robustness"; U.S. patent application Ser. No. 10/413,194, entitled "Systems for Preventing Channel Control Values from being Corrupted to thereby Improve Servo-Demodulation Robustness"; U.S. patent application Ser. No. 10/413,338, entitled "Methods for Improving Servo-Demodulation Robustness"; U.S. patent application Ser. No. 10/413,043, entitled "Methods for Detecting Multiple Occurrences of a SAM Pattern to Thereby Improve Servo-Demodulation Robustness"; and U.S. patent application Ser. No. 10/413,339, entitled "Methods for Preventing Channel Control Values from being Corrupted to Thereby Improve Servo-Demodulation Robustness."

This application also relates to the following commonly invented and commonly assigned applications, each of which was filed on Jul. 16, 2003: U.S. patent application Ser. No. 10/621,048, entitled "Systems for Searching for SAM Patterns at Multiple Nominal Frequencies"; U.S. patent application Ser. No. 10/620,661, entitled "Methods for Searching for SAM Patterns at Multiple Nominal Frequencies"; U.S. patent application Ser. No. 10/620,818, entitled "Servo Demodulator Systems including Multiple Servo Demodulators"; U.S. patent application Ser. No. 10/620,971, entitled "Methods for Searching for SAM Patterns using Multiple Sets of Servo Demodulation Detection Parameters."

This application also relates to U.S. patent application No. 10/665,264, entitled "Systems for Limiting Channel Control Values to thereby Improve Servo Demodulation Robustness," which was filed on the same date as the present application.

FIELD OF THE INVENTION

This invention relates to disk drives, and more particularly to improving servo demodulation robustness.

BACKGROUND

Disk drives typically include one or more disks that define a multiplicity of concentric data tracks. Head position control systems are typically used to move a transducer (head) from a departure track to a destination track location during track seeking operations, to settle the head at the vicinity of the destination track during track settling operations, and to follow the read or write centerline of the destination track during track following operations when data information is written on or read from the disk.

Servo head position information is typically embedded within servo wedges on a disk, which are usually recorded in evenly spaced apart areas or sectors of a track. The embedded servo wedges includes servo head position and track/data identification fields, and typically include a recognizable servo address mark (SAM) pattern which is provided to resynchronize timers for recovering the servo head position and the track/data identification field information, and which mark in time an expected arrival of the next embedded servo wedge. SAM patterns (often simply referred to hereafter as SAMs), in the past, were intended to be unique from patterns that may appear in data or in other portions of a servo wedge. However, that is no longer the case, and patterns equivalent to a SAM may appear in data or in other parts of a servo wedge. Further, a demodulated signal may include a pattern that resembles a SAM pattern because of noise or flaws on the disk media.

Conventionally, a servo demodulator determines when or where to start searching for a SAM pattern by timing from the most recent SAM that was detected. Typically, the servo demodulator searches for the SAM during a timing window, that is centered a pre-determined (SAM-to-SAM) time after the most recently detected SAM, with a width equal to a specified timing-variation tolerance. If the SAM is not detected within the window, then the timing of the search for the next SAM is determined by "free-wheeling," based upon the last SAM that was actually demodulated. When the next SAM is detected (i.e., the SAM following a missing SAM), the timing circuitry is re-set to begin looking for the following SAM based upon the timing of the SAM just detected. This conventional scheme can typically get though at least one missing SAM, and detect the next SAM (which is hopefully good, and can be detected). However, the servo demodulator may inadvertently detect a SAM pattern in the wrong place. This may occur, for example, because another portion of the servo wedge is substantially identical to the SAM (or due to noise, or media or signal corruption, appears substantially identical to the SAM). If this occurs, the demodulator will begin to search for the next SAM at the wrong time or place. In this manner, a single bad SAM detection could cause the servo demodulator to completely lose lock, adversely affecting the performance of the disk drive.

The servo demodulator is also used to determine channel control values, such as servo automatic gain control (AGC) and servo phase lock loop (PLL) values, which are respectively used to control the gain of the channel and the frequency of an oscillator associated with the channel. However, for various reasons these channel control values can be corrupted, which can contribute to the servo demodulator losing lock, and thus adversely affect performance of the disk drive.

There is a need to decrease the likelihood of, and hopefully prevent, the servo demodulator from losing lock.

BRIEF DESCRIPTION OF THE DRAWINGS

FIG. 6 is a timer value vs. time graph that is useful for explaining freewheeling;

FIG. 7 is a timer value vs. time graph that is useful for explaining embodiments of the present invention where a SAM search window is adjusted;

DETAILED DESCRIPTION

Systems and methods are also provided for increasing servo demodulation robustness by keeping channel control values, such as servo automatic gain control (AGC) values and/or servo phase lock loop (PLL) values, within respective desired ranges.

According to other embodiments of the present invention, servo demodulator outputs (e.g., SAM patterns, track numbers and/or burst values, etc.) are checked for "sanity." If the demodulation output appears bad (e.g., does not resemble a predicted or expected output), the servo demodulator timing circuitry can be re-programmed to search for the next SAM based upon the timing of a previous (e.g., the most recently detected) SAM pattern detection that met the sanity check. This way, a single bad SAM detection will not cause the servo demodulator to lose lock.

Systems and methods are provided for using servo address mark (SAM) pattern detections to improve servo-demodulation robustness. SAM pattern detections are characterized as either good SAM detections or bad SAM detections. Further servo functions are then based on whether the detection of the SAM pattern in a servo wedge was characterized as a good SAM detection or characterized as a bad SAM detection.

In accordance with embodiments of the present invention, multiple occurrences of the SAM pattern are searched for in a single servo wedge. Each detection of the SAM pattern in the servo wedge is characterized as a good SAM detection or a bad SAM detection. If more than one detection of the SAM pattern in the servo wedge are characterized as good SAM detections, one of the detections is selected as the best good SAM detection. Further servo functions can then be performed based on the best good SAM detection.

In accordance with embodiments of the present invention, the SAM pattern is searched for in a servo wedge. If the SAM pattern is detected in the first servo wedge, one or more channel control values (e.g., servo AGC and/or PLL values) associated with the first servo wedge are stored, and a determination is made whether to characterize the detection of the SAM pattern as either a good SAM detection or a bad SAM detection. If the detection of the SAM pattern is characterized as a good SAM detection, then the just stored channel control values are used as starting values when beginning to read a next servo wedge. However, if the SAM pattern is not detected, or a detection is characterized as bad, one or more previously stored or predicted channel control values are used as starting values when beginning to read the next servo wedge.

Further embodiments, features, aspects, and advantages of the present invention will become more apparent from the additional description set forth below, the drawings and the claims.

Exemplary Disk

Figure 1:
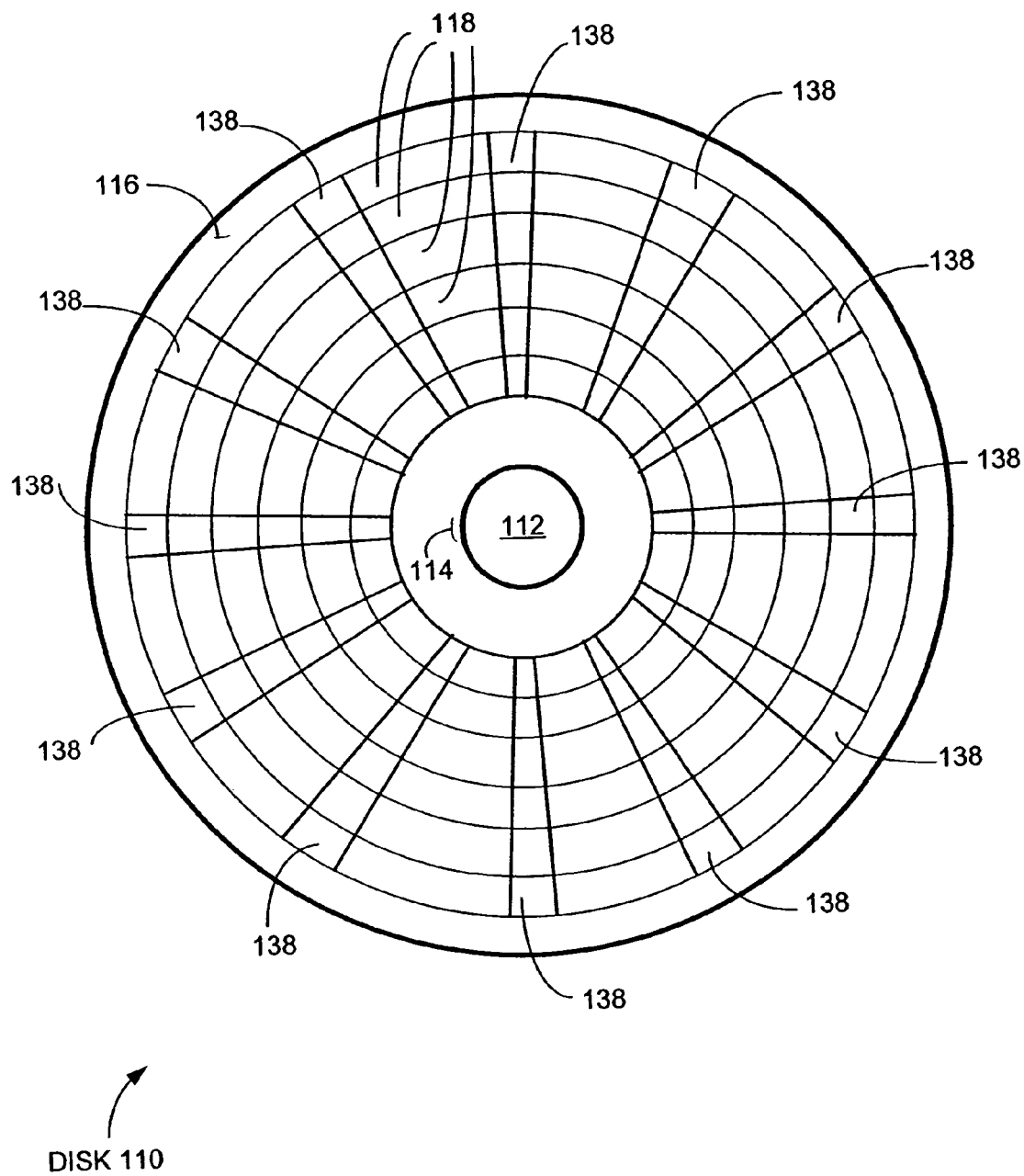
FIG. 1 is a plan view showing exemplary data and servo patterns on a storage disk.

Before describing the various embodiments of the present invention, it is useful to first explain an exemplary disk drive system that stores information on rotatable storage disks. FIG. 1 is a plan view of an exemplary rotatable storage disk 110. The disk 110 includes a central opening 112 to enable a rotating hub to securely clamp the disk to a disk spindle. Between an inner area 114 and an outer peripheral area 116, a data storage area of a multiplicity of concentric data tracks is defined. The tracks are arranged into multiple data zones 118 (also known as data fields or user data fields), from a radially outermost data zone 118 to a radially innermost data zone 118. A system information region and a diagnostics and guard region typically lies near the inner diameter and/or outer diameter of the disk 110, outside the data storage area.

FIG. 1 also depicts a series of radially extending servo sectors 138 (also known as servo fields or servo wedges). The radial servo sectors 138 (shown as several narrow spokes in FIG. 1, but are typically somewhat curved) are typically equally spaced around the circumference of the disk 110. While the number of data sectors in each zone varies, it is apparent from inspection of FIG. 1 that the number of embedded servo wedges 138 remains invariant throughout the extent of the storage surface. As each data sector is of fixed storage capacity or length (e.g. 512 bytes of user data per data sector), and since the density and data rates vary from data zone to data zone, the servo sectors 138 interrupt and split up at least some of the data sectors or fields. The servo sectors 138 are typically recorded with a servo writing apparatus at the factory, but may be written (or partially written) by a self-servowriting operation.

The number and scale of the various data zones 118 and servo wedges 138 shown in FIG. 1 are not precise. For example, there is likely more data zones 118 and servo wedges 138 than shown. Further, the servo wedges 138 likely take up less area on the disk 110 than shown.

Exemplary Servo Wedge

Figure 2:
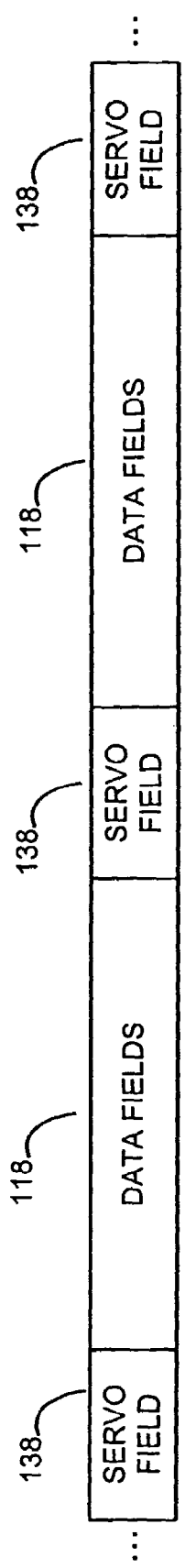
FIG. 2 is an illustration of servo and data fields within a track of the disk shown in FIG. 1.

FIG. 2 illustrates the repeating of servo fields 138 and data fields 118 in a track. Each servo field 138 is physically associated with the immediately following data fields 118, as determined by the direction of rotation of the disk 110 relative to a head. A plurality of servo fields 138 and data fields 118 are recorded on each track. The number of tracks on each disk is usually relatively high (e.g., greater than two thousand).

Figure 3:
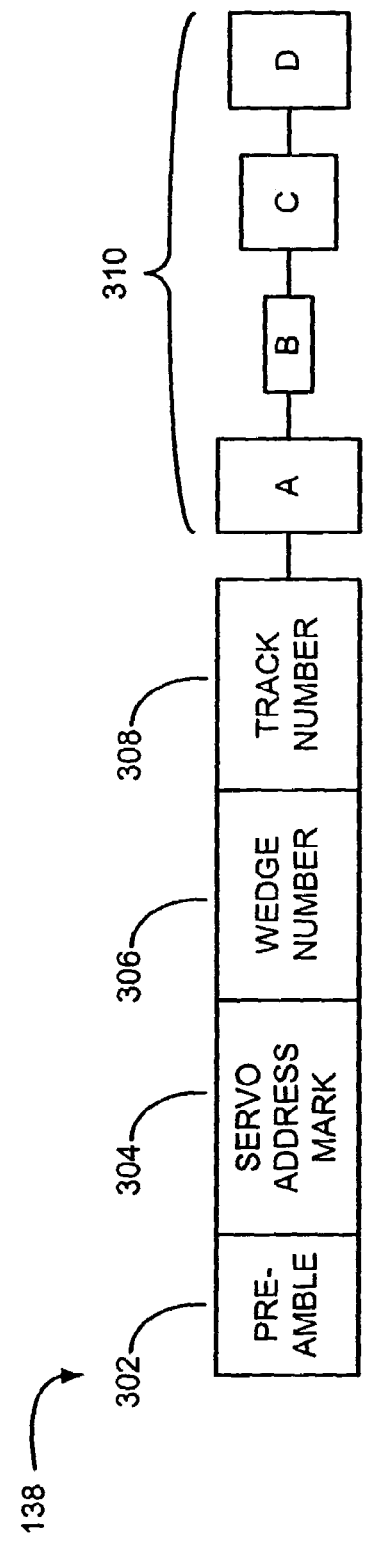
FIG. 3 is an illustration of exemplary subpart fields within a servo field shown in FIG. 2.

Each servo wedge 138 is formed by a number of subpart fields as shown in FIG. 3. Each servo wedge 138 typically includes a preamble 302, a servo address mark ("SAM") 304, a wedge number 306, a track number code 308 and a number of off-track bursts 310, typically four. The order in which these subpart fields occur is sometimes changed. Also, there may be additional and/or different subpart fields, which are not shown in this example.

The preamble 302 is a series of magnetic transitions which represents the start of the servo field 138. A signal produced while reading the preamble 302 can be used to adjust an automatic gain control (AGC) and/or a phase lock loop (PLL) of a servo demodulator, to allow demodulation of the rest of the servo wedge 138. The SAM 304, which specifies the beginning of available information from the servo wedge 138, is typically used to resynchronize timer(s) for recovering the servo head position and the track/data identification field information, and to mark in time the expected arrival of the next servo wedge 138. It is noted that some disk drive companies refer to the SAM pattern as a servo synchronization mark (SSM). Thus, the term SSM may be substituted for the term SAM, as used herein.

The wedge number 306 (which may simply be an index mark), is used to count the number of servo fields in each track when the disk 110 is rotating. A different wedge number can uniquely identify each servo wedge. Alternatively, if the wedge number is simply an index mark, the wedge number can be, for example, a data bit "one" for an index servo wedge, and a data bit "zero" for all other servo wedges. The term wedge number is also meant to cover other numbers or marks that are used to indicate the rotational position of a disk, relative to a head.

The track number 308, which is usually gray coded, is used for uniquely identifying each track. The off-track bursts 310 (pictorially represented as A, B, C and D) are employed to control the fine positioning of a read/write head relative to the tracks. In general, the subpart fields 302–310 that form the servo wedge 138 contain control information that is used for servo control to achieve proper operation of a head disk assembly (HDA) of a disk drive storage device.

Exemplary Disk Drive Device

Figure 4:
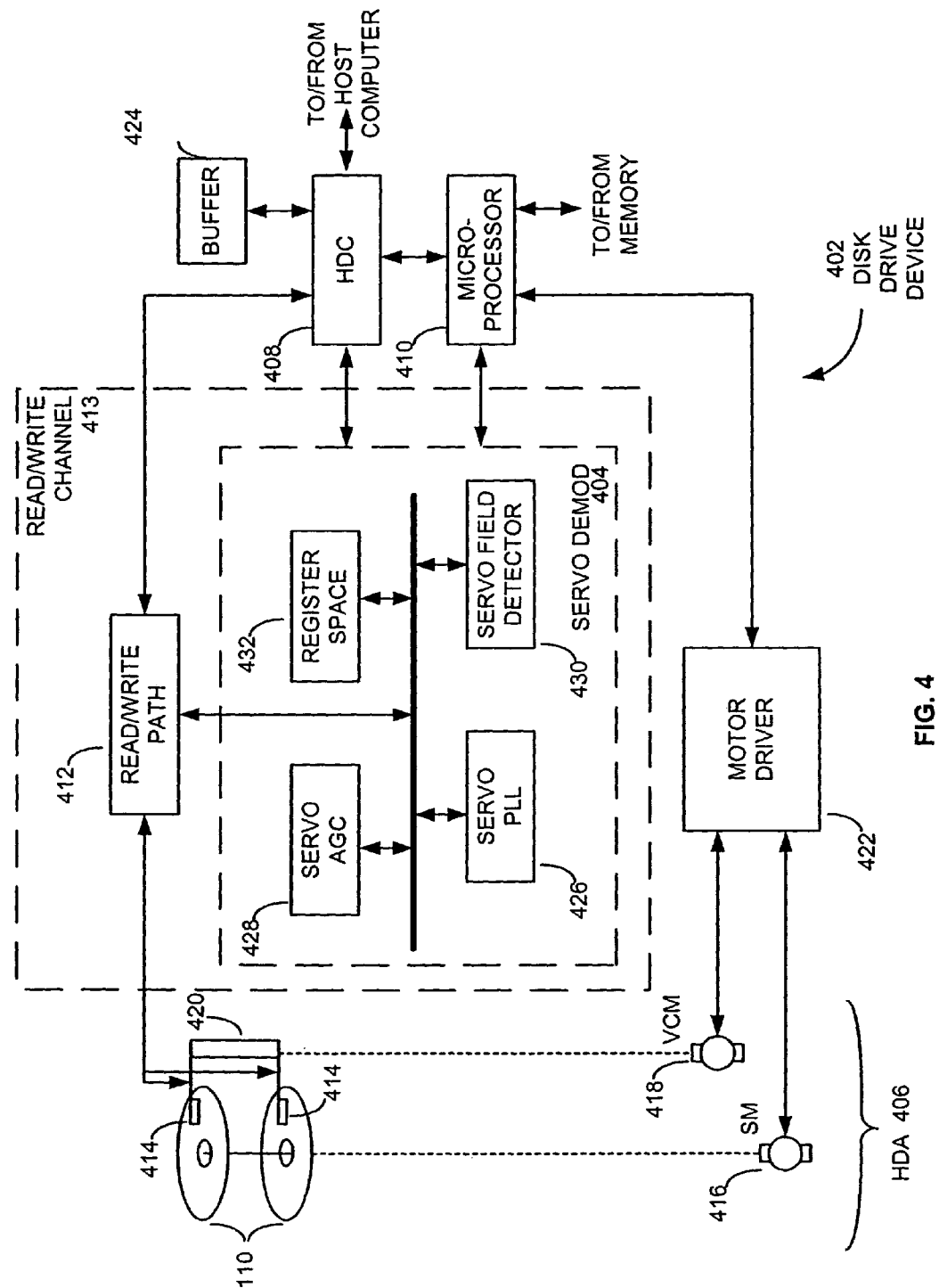
FIG. 4 is a high level diagram of an exemplary disk drive device, which can implement embodiments of the present invention.

FIG. 4 is a high level diagram of an exemplary disk drive storage device 402. Referring to FIG. 4, the disk drive device 402 is shown as including a head disk assembly (HDA) 406, a hard disk controller (HDC) 408, a read/write channel 413, a microprocessor 410, a motor driver 422 and a buffer 424. The read/write channel 413 is shown as including a read/write path 412 and a servo demodulator 404. The read/write path 412, which can be used to read and write user data and servo data, may include front end circuitry useful for servo demodulation. The read/write path 412 may also be used for writing servo information in self-servowriting. Additional details of the read/write path 412 and the servo demodulator 404 are discussed below with reference to FIG. 5. One of ordinary skill in the art will appreciate that the drive 402 includes additional components, which are not shown because they are not necessary to explain the embodiments of the present invention.

The HDA 406 includes one or more disks 110 upon which data and servo information can be written to, or read from, by transducers 414, often referred to as heads 414. A spindle motor (SM) 416 rotates the disks 110 with respect to the heads 414. A voice coil motor (VCM) 418 moves an actuator 420 to position the heads 414 on the disks 110. The motor driver 422 drives the VCM 418 and the SM 416. More specifically, the microprocessor 410, using the motor driver 422, controls the VCM 418 and the actuator 420 to accurately position the heads 414 over the tracks (described with reference to FIGS. 1–3) so that reliable reading and writing of data can be achieved. The servo fields 138, discussed above in the description of FIGS. 1–3, are used for servo control to keep the heads 414 on track and to assist with identifying proper locations on the disks 110 where data is written to or read from. When reading a servo wedge 138, the heads 414 act as sensors that detect the position information in the servo wedges 138, to provide feedback for proper positioning of the heads 414.

Among other functions, the HDC 408 enables the disk drive device 402 to communicate with a host computer (e.g., a personal computer or web server). For example, the HDC 408 may control the transfer of user data (as opposed to servo data) between the read/write path 412 and the host computer. The HDC 404 will most likely use the buffer 424 when performing such transfers. The read/write path 412 includes electronic circuits used in the process of writing and reading information to and from disks 110. The microprocessor 410, which can be a micro-controller, includes firmware that can be used to perform various embodiments of the present invention. The microprocessor 410 can also perform servo control algorithms, and thus, may be referred to as a servo controller. Alternatively, a separate microprocessor or digital signal processor (not shown) can perform servo control functions.

Figure 5:
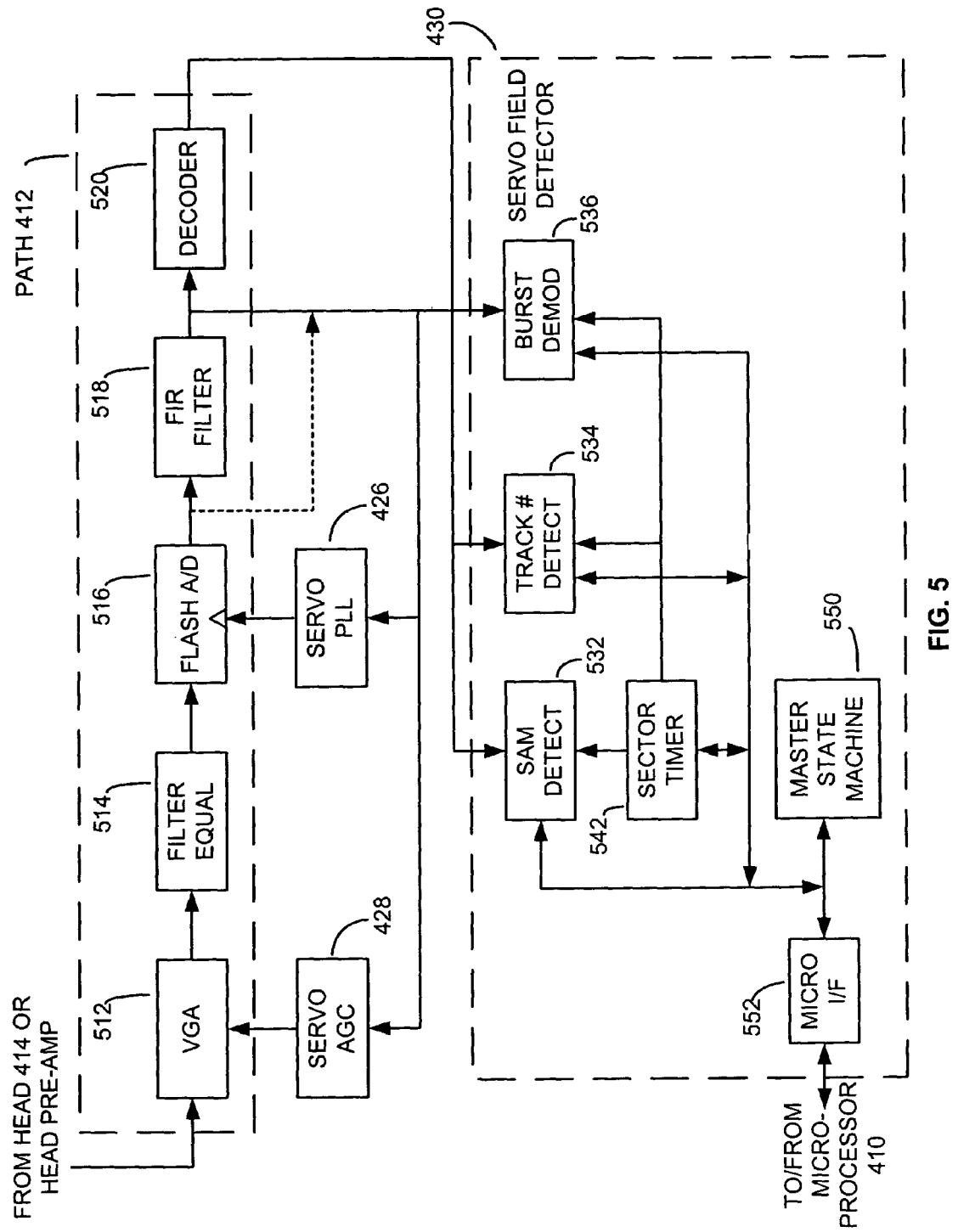
FIG. 5 is a high level diagram showing exemplary portions of the read/write path and the servo field detector of FIG. 4.

The servo demodulator 404 is shown as including a servo phase locked loop (PLL) 426, a servo automatic gain control (AGC) 428, a servo field detector 430 and register space 432. The servo PLL 426, in general, is a control loop that is used to provide frequency and phase control for the one or more timing or clock circuits (not specifically shown in FIG. 4), within the servo demodulator 404. For example, the servo PLL 426 can provide timing signals to the read/write path 412. The servo AGC 428, which includes (or drives) a variable gain amplifier, is used to keep the output of the read/write path 412 at a substantially constant level when servo wedges 138 on one of the disks 110 are being read. The servo field detector 430, which is discussed in more detail with reference to FIG. 5, is used to detect and/or demodulate the various subfields of the servo wedges 138, including the SAM 304, wedge number 306, track number 308 and servo bursts 310. The microprocessor 410 is shown as being separate from the servo demodulator 404. However, because the microprocessor 410 is used to perform various servo demodulation functions (e.g., decisions, comparisons, characterization and the like), the microprocessor 410 can be thought of as being part of the servo demodulator 404, or the servo demodulator 404 can have its own microprocessor.

The servo fields 138 are typically written at a different frequency than the interspersed user data fields 118. Because of this, the read/write path 412 will either switch between independent signal paths, or switch characteristics of common processing circuitry. To accomplish this, information for the servo AGC 428 can be stored in registers and/or memory, allowing the information to be updated in the servo AGC 428 each time the read/write path 412 transitions between reading user data and servo data. For example, one or more registers (e.g., in register space 432) can be used to store appropriate servo AGC values (e.g., gain values, filter coefficients, filter accumulation paths, etc.) for when the read/write path 412 is reading servo data, and one or more registers can be used to store appropriate values (e.g., gain values, filter coefficients, filter accumulation paths, etc.) for when the read/write path 412 is reading user data. A control signal can be used to select the appropriate registers according to the current mode of the read/write path 412. The servo AGC value(s) that are stored can be dynamically updated. For example, the stored servo AGC value(s) for use when the read/write path 412 is reading servo data can be updated each time an additional servo wedge 138 is read. In this manner, the servo AGC value(s) determined for a most recently read servo wedge 138 can be the starting servo AGC value(s) when the next servo wedge 138 is read.

In addition to storing servo AGC information, servo PLL information (e.g., a servo PLL frequency) can be stored in registers and/or in memory, allowing the servo PLL information to be dynamically updated. For example, a servo PLL frequency value determined for a most recently read servo wedge 138 can be the starting servo PLL frequency when the next servo wedge 138 is read.

Referring now to FIG. 5, some additional details of an exemplary read/write path 412 and an exemplary servo field detector 430 are shown. Since embodiments of the present invention relate more to read operations, than to write operations, only read portions or the exemplary read/write path 412 are shown. The read portion of path 412 is shown as including a variable gain amplifier (VGA) 512, which receives signals from heads 414, or more likely from a pre-amplifier (not shown) driven by a signal received from heads 414. As mentioned above, the VGA 512 may be external to the read/write path 412. During servo reading, the VGA 512 is at least partially controlled by the servo AGC 428. Additional amplifiers, such as buffer amplifiers and/or one or more additional VGAs may also be present. The path 412 is also shown as including an analog filter/equalizer 514, a flash analog-to-digital (A/D) converter 516, a finite impulse response (FIR) filter 518 and a decoder 520. Alternatively, the FIR filter 518 can be upstream of the A/D converter 516, and FIR filtering can be performed using analog circuitry.

During servo reading, magnetic flux transitions sensed by the selected head 414 are likely preamplified before being provided to the VGA 512, which controls amplification of an analog signal stream. The amplified analog signal stream is then provided to the analog filter/equalizer 514, which can be programmed to be optimized for the data transfer rate of the servo data being read by one of heads 414. The equalized analog signal is then subjected to sampling and quantization by the high speed flash A/D 516 which generates raw digital samples that are provided to the FIR filter 518. Timing for sampling can be provided by the servo PLL 426, as shown. Alternatively, sampling may be performed asynchronously, e.g., using an asynchronous clock (in which case, most features of the present invention are still useful). The FIR filter 518 filters and conditions the raw digital samples before passing filtered digital samples to the decoder 520. The decoder 520 decodes the digital sample stream and outputs a binary signal. The servo PLL 426 can also provide other timing signals that are necessary for the path 412 and portions of the servo demodulator 404 to operate properly.

The binary signal output is provided to the servo field detector 430, and more specifically to a SAM detector 532 and a track number detector 534 of the servo field detector 430. The output of the FIR filter 518 is provided to a burst demodulator 536. Alternatively, the output of the flash A/D 516 can be provided to the burst demodulator 536. The SAM detector 532 searches for a SAM using, for example, pattern recognition logic that recognizes the SAM pattern within the binary stream. The SAM detector 532 can allow some fault or error tolerance, so that a SAM pattern will be detected even if one or more of the bits in the binary stream do not exactly match the SAM pattern. As a consequence, should minor errors occur in reading or writing the SAM patterns, it may still be possible to fully demodulate the information contained in the servo wedge 138 and to read and write data in the data fields 118 following the servo wedge 138 in which the errors were detected. An exemplary error tolerant SAM detection circuit is disclosed in U.S. Pat. No. 5,477,103 to Romano et al., entitled "Sequence, Timing and Synchronization Technique for Servo System Controller Of A Computer Disk Mass Storage Device," which is incorporated herein by reference. The track number detector 534 performs decoding of gray codes (if necessary) and detects track numbers. The burst demodulator 536 measures burst amplitudes and/or phases. The servo field detector 430 may also include a wedge number detector, not shown. The wedge number detector would detect a wedge number to determine which wedge is being read. The wedge number detector can alternatively detect an index mark type wedge number and determine which wedge is being read based on the number of wedges that have been passed since the index mark was detected.

The exemplary servo field detector 430 is shown as also including a master state machine 550, which generates states providing timing signals and windows for each of the subpart fields 302, 304, 306 and 310 of each servo wedge 138. The master state machine 550 can also supervise operation of various other elements that may be part of the servo field detector 430.

A sector timer 542 can be used for controlling the length of a servo wedge 138, for controlling a SAM search window, and other servo data reader functions including, for example, servo interrupt, servo-data overwrite protection, write to read recovery time and AGC timing. The sector timer 542 is, for example, a 12-bit (or more) upcounting, synchronously loadable counter running at one half of the operating frequency of the servo field detector 430. Each sector timer count can be a clock cycle, which is, for example, 10.0 nanoseconds. Rather than using the sector timer 542 (or in addition to using the sector timer 542), a delay timer (not shown) can be used to perform functions of, or similar to, the sector timer 542. Alternatively, a programmed finite-state machine can be used to perform timing functions (and to perform the functions of the master state machine 550).

One of ordinary skill in the art will appreciate that the path 412 and the servo field detector 430 may include additional components, which are not shown because they are not necessary to explain the embodiments of the present invention.

Searching for SAM Patterns

In accordance with some embodiments of the present invention, when the master state machine 550 (together with the SAM detector 532) detects a servo address mark (SAM), it signals the sector timer 542 causing the present value of the sector timer to be saved (e.g., in register space 432 or memory), and the sector timer 542 to be reset to zero. The value stored, which is known as the SAM-to-SAM value, can be used to determine where/when to search for the next SAM.

The master state machine 550 (together with the SAM detector 532) searches for a next SAM within a search window, defined about an expected value (e.g., defined about a sector timer value where the next SAM is expected to be detected). The expected value can be based, for example, on the most recently detected SAM-to-SAM value, on a group of recently detected SAM-to-SAM values (e.g., based on an average of the previous few SAM-to-SAM values), or based on a nominal or predetermined SAM-to-SAM value. More specifically, the search window can be defined by a STARTSEARCH value (e.g., stored in a STARTSEARCH register) and an ENDSEARCH value (e.g., stored in an ENDSEARCH register).

Free-Wheeling

If the master state machine 550 misses detection of a SAM, the sector timer 542 does not get reset and keeps counting upward. When the sector timer 542 reaches the time equal to the ENDSEARCH value, it sends a signal to the master state machine 550, indicating a timeout condition has occurred. At this point, the sector timer 542 loads the value from a TIMESUP load time register, which is the time the sector counter 542 would nominally be at had the SAM been detected at the expected time and the sector timer 542 reset. Loading the TIMESUP load time value into the sector timer 542 enables demodulation of some of the remaining sub-fields of the servo wedge and searching for the next SAM at the correct time/location. The above process, which occurs after missing the detection of a SAM, is often referred to as "free-wheeling."

The concept of free-wheeling can be better appreciated from the Sector Timer Value vs. Time graph shown in FIG. 6. In FIG. 6, a dashed line 602 represents the value of the sector timer 542 that triggers the servo demodulator 404 to begin searching for the SAM. This value is referred to as the STARTSEARCH value, which can be stored in a STARTSEARCH register or in memory. A dashed line 604 represents the value of the sector timer 542 at which the SAM is expected, referred to hereafter as a EXPECTSAM value, which can be stored in an EXPECTSAM register and/or in memory. As mentioned above, the EXPECTSAM value can be a nominal or predetermined value, or it can be dynamic by being based on one or more previous SAM-to-SAM values. A dashed line 606 represents the ENDSEARCH value (i.e., the value of the sector timer 542 that will trigger a timeout), which can be stored in an ENDSEARCH register or in memory. As mentioned above, the STARTSARCH value and the ENDSEARCH value define a search window for the SAM pattern, with the EXPECTSAM value defining the expected time/location of the SAM pattern within the window.

In this example, the SAM is detected at times t1 and t2. However, the SAM is not detected at time t3, and eventually the sector timer value equals the ENDSEARCH value. At this time, the timeout condition has occurred and the sector timer 542 loads the value from the TIMESUP load time register (or from memory), which is represented by dashed line 608. This enabled the next SAM to be detected at time t4. For a more specific example, assume the STARTSEARCH value equals 990, the EXPECTSAM value equals 1000, and the ENDSEARCH value equals 1010. The difference between the EXPECTSAM value and the ENDSEARCH value in this example equals 10 (i.e., 1010−1000=10), which is the value in the TIMEUP load time register represented by dashed line 608. Once the timeout condition occurs, the sector timer 542 is reset to 10 (instead of zero), enabling the servo field detector 430 to detect the next SAM at time t4.

Deficiencies of Free-Wheeling

Free-wheeling provides a way for the servo field detector 430 to detect a next SAM, if a SAM is missed, as explained above. However, free-wheeling does not provide a solution for the situation where another portion of a servo wedge, which is identical to the SAM (or due to noise, or media or signal corruption, appears identical to the SAM), is detected instead of an actual SAM. The detection of another portion of the servo wedge that is identical to the SAM pattern or appears to be the SAM pattern, but is not intended to be the SAM, is referred to herein as a "bad SAM detection." In contrast, the detection of a SAM pattern that is intended to act as a SAM (i.e., written on the disk to function as a SAM), shall be referred to herein as a "good SAM detection." A bad SAM detection may also occur because an error tolerant SAM detection circuit made an incorrect decision.

In a conventional servo demodulator, when a bad SAM detection occurs, the sector timer to is reset to zero. Because the sector timer is reset to zero at the wrong time, the servo field detector will start to search for the next SAM at the wrong time (and thus, at the wrong location on the disk). There is still a chance that the servo field detector will detect a good SAM in the next servo wedge, even if it begins looking at the wrong time/location. However, it is possible that once a bad SAM detection occurs, that the servo demodulator will completely lose lock, requiring the servo demodulator to halt and restart in order to relock the servo signal. Such relocking of the servo signal is time consuming, reducing the performance of the drive. Further, if a bad SAM detection repeatedly occurs at a specific location on a disk, it may make it impossible to retrieve previously written data.

As just explained, a single bad SAM detection can cause the servo demodulator to completely lose lock. Embodiments of the present invention, as described below, reduce the likelihood, and hopefully prevent, the servo demodulator from losing lock after a bad SAM detection.

A bad servo signal can also cause the servo AGC and/or PLL values that are stored, as explained above, to be corrupted. As explained above, servo AGC and/or PLL values can be stored in registers or memory so that values determined while reading one servo wedge 138 can be used as the starting values for reading a next servo wedge 138. When a servo wedge 138 is corrupted, it is possible that the values determined for servo AGC and servo PLL during that servo wedge 138 are garbage (i.e., corrupted). For example, if the servo wedge 138 was DC erased, the servo AGC 428 may over amplify a very low amplitude servo signal, and may even saturate itself and/or the VGA 512. Similarly, if the servo wedge 138 has been essentially erased, or is absent due to a media defect on the disk 110, the servo PLL may become erratic while attempting to lock to a corrupt servo signal. Thus, a bad servo wedge can also cause the values determined for servo AGC and servo PLL, during that servo wedge, to be garbage (i.e., corrupted). If these garbage values are used as starting values when the next servo wedge 138 is read, it is likely that it will take at least the entire next servo wedge 138 for the servo AGC 428 and the servo PLL 426 to recover (e.g., because the servo AGC 428 is saturated and the servo PLL 426 is erratic), causing the SAM in the next servo wedge 138 to be missed. This in turn can cause the servo demodulator 404 to completely lose lock. When this occurs, the whole concept, of having what is learned from one servo wedge influencing how a next wedge is read, backfires. Embodiments of the present invention, as described below, reduce the likelihood, and hopefully prevent, the servo AGC 428 and the servo PLL 426 from retrieving and using garbage values.

Characterizing a SAM Detection as Good or Bad

As explained above, in a conventional servo demodulation circuit, the sector timer 542 is automatically reset to zero after a good SAM detection or a bad SAM detection.

This functionality already exists in many servo demodulators. Some embodiments of the present invention are directed to reducing the probability that this type of demodulator will lose lock after a bad SAM detection. More specifically, these embodiments provide a way to overcome the situation where the sector timer 542 is wrongly reset to zero because of a bad SAM detection.

As mentioned above, when the SAM is detected (whether a good or bad detection), the master state machine 550 signals the sector timer 542 to cause the present value of the sector timer 542 to be saved as a SAM-to-SAM value, and the sector timer 542 to be reset to zero. When this occurs, the previous SAM-to-SAM value (e.g., in the SAM-to-SAM time register or memory) is typically written over and the sector timer value is reset to zero, affecting when/where to search for the SAM in the next servo wedge 138.

Conventionally, after the SAM pattern is detected in a servo wedge 138, the servo demodulator 404 determines a wedge number value, a track number value and a burst value. Based on these values, the servo demodulator 404 can determine (e.g., calculate) a position error signal (PES). For example, a PES can be calculated based on a track number value and a burst value (e.g., a burst amplitude value).

In accordance with embodiments of the present invention, future wedge number values, track number values, burst values and/or PES values are predicted. The prediction of a next wedge number value is easily determined based on a previous wedge number value. Prediction of the other servo demodulation values can be determined, for example, using state space estimation. Such state space estimation can be performed, for example, in software and/or firmware (e.g., using the microprocessor 410) that run models to produce predicted values. State space estimation is discussed in various control system books, such as "Digital Control of Dynamic Systems, Second Edition," by Franklin, Powell and Workman, Addison-Wesley Publishing Company, Inc. (1980). Factors taken into account in these predictions can include, for example, previously detected wedge number values, track number values and/or burst values. A value can be predicted for the wedge number, track number, burst value and/or PES, or a range of values can be predicted. Such a range of values can include either a plurality of different values, or two values that define boundaries.

In accordance with embodiments of the present invention, each detection of the SAM pattern is characterized as a good SAM detection or a bad SAM detection. Such characterizations can be based on comparisons between the actual servo demodulation values and the predicted servo demodulation values. These characterizations may not be completely accurate (i.e., a detection of a pattern intended to be a SAM may be characterized as a bad SAM detection, or a detection of a pattern not intended to be a SAM pattern may be characterized as a good SAM detection). However, the accuracy of the characterizations can be made very high using the various embodiments discussed below.

In accordance with embodiments of the present invention, if an actual servo demodulation value (e.g., a wedge number value) is substantially equal to (i.e., equal to, or with an allowed tolerance of) a predicted value, a detection of the SAM is characterized as a good SAM detection. In embodiments where a range of servo demodulation values are predicted (e.g., a range of PES values), a detection of the SAM pattern can be characterized as a good SAM detection if an actual servo demodulation value (e.g., an actual PES value) is within the range of predicted values. A plurality of predicted and actual servo demodulation values can be determined for a servo wedge. The plurality of predicted values (or ranges of values) can then be compared to the actual servo demodulation values in order to characterize the SAM detection as a good or a bad SAM detection. Where multiple types of servo demodulation values are being predicted and actually determined, the results of the multiple comparisons performed can be weighted equally, or weighted differently, during characterization. In accordance with embodiments of the present invention, multiple comparisons can be used to produce a confidence value, which can be compared to a confidence threshold, in order to characterize a SAM detection as a good or bad SAM detection.

Alternatively, or additionally, the confidence of one or more specific values (e.g., a track number value or a wedge number value) and/or the confidence for a SAM detection can be determined, and these confidence determination(s) can be included in the good/bad SAM detection characterizations. Such confidence determinations can be based, for example, on the number of matched (or mismatched) bits in a pattern just read.

Confidence determinations can alternatively, or additionally, be based on amplitudes of servo signal samples that make up a detected SAM pattern. For example, demodulated bits can be characterized as low confidence or high confidence bits, and the occurrence of low confidence bits (and/or high confidence bits) can be factored into the good/bad SAM detection characterization. U.S. Pat. No. 5,862,005 to Leis et al., entitled "Synchronous detection of wide bi-phase coded servo information for disk drive," and U.S. Pat. No. 5,384,671 to Fisher, entitled, "PRML sampled data channel synchronous servo detector," which are incorporated herein by reference, discuss exemplary schemes that can be used for specifying the confidence of bits.

As explained above, in the discussion of FIG. 6, the servo demodulator 404 has access to an EXPECTSAM value, which was represented by dashed line 604. As mentioned above, the EXPECTSAM value can be a nominal or predetermined value, or it can be dynamic by being based on one or more previous SAM-to-SAM values. If dynamic, the dashed line 604 may not be as straight or horizontal as shown in FIG. 6. In accordance with an embodiment of the present invention, the extent that an actual SAM-to-SAM value (associated with a detected SAM pattern) differs from the EXPECTSAM value is used as a factor when characterizing a SAM detection as a good or a bad SAM detection. For example, a determination, that the difference between the present SAM-to-SAM value and the EXPECTSAM value is greater than a threshold, can be used when characterizing a SAM pattern detection as a bad or a good SAM detection. More specifically, the determination that the difference between the actual SAM-to-SAM value and the EXPECTSAM value is greater than a threshold, can be used together with a comparison(s) between predicted and actual values for the PES, wedge number value, track number value, burst value and/or quality value(s) when characterizing a detection of the SAM pattern as a good or a bad SAM detection. These various factors can be weighted equally, or differently, as desired.

Assuming a SAM detection is characterized as a good SAM detection, the servo demodulator 404 searches for the SAM pattern in the next servo wedge 138 as it normally would. However, if a SAM detection is characterized as a bad SAM detection, then embodiments of the present invention provide a way to overcome the situation where the sector timer 542 is wrongly reset to zero (which will cause the servo demodulator 404 to search for the next SAM at the wrong time/location). More generally, the present invention can be used to help prevent the servo demodulator 404 from losing lock after a bad SAM detection.

Performing Servo Functions Based on Whether a Detection of the SAM Pattern is Characterized as a Good or a Bad SAM Detection The Sector Timer Value vs. Time graph of FIG. 7 will now be used to help explain how embodiments of the present invention can prevent the servo demodulator 404 from losing lock after a bad SAM detection. In FIG. 7, as in FIG. 6, dashed line 602 represents the value of the sector timer 542 that triggers the SAM detector 532 to begin searching for a SAM (e.g., the STARTSEARCH value), dashed line 604 represents the value of the sector time at which the SAM is expected (e.g., the EXPECTSAM value), and dashed line 606 represents the ENDSEARCH value (i.e., the value of the sector timer 542 that will trigger a timeout condition).

In this example, the SAM pattern is detected at times t1 and t2 (assume these are good SAM detections). Additionally, the SAM pattern is detected at time t3-n, which is earlier than the next expected SAM time t3. As explained above and as shown in FIG. 7, conventionally the sector timer 542 is automatically reset to zero at time t3-n, whether a good SAM detection or a bad SAM detection occurred at time t3-n. Conventionally, this will cause the servo demodulator 404 to start searching for the next SAM at an earlier than appropriate time/location (because the sector timer 542 was reset to zero earlier than appropriate). Additionally, the time/location of the next EXPECTSAM and ENDSEARCH will be adversely effected. This may result in another bad SAM detection, or missing the next SAM, in turn resulting in the servo demodulator 404 losing lock.

Now, assume that an embodiment of the present invention, as described above, is used to characterize the detection of the SAM pattern at time t3-n as a bad SAM detection. In accordance with an embodiment of the present invention, the SAM pattern in the next servo wedge 138 will be searched for based on when/where the previous SAM pattern, that was characterized as a good SAM detection, was detected. In this example the sector timer 542 was already reset to zero, and has begun counting. The searching for the next SAM based on a time/location of a detected SAM pattern, characterized as a good SAM detection, is accomplished by beginning to search for the next SAM pattern at a later time/location. For example, assume that the stored STARTSEARCH value equals 990, the stored EXPECTSAM value equals 1000, and the stored ENDSEARCH value equals 1010. Also assume the SAM pattern characterized as a bad SAM detection was detected when the sector timer value was 992, and that the previous SAM pattern, characterized as a good SAM detection, was detected when the sector timer value was 1000. Thus, the bad SAM detection in this example occurred 8 sector timer counts earlier than the EXPECTSAM value. As just mentioned, one of the embodiments of the present invention, described above, is used to characterize the current SAM detection as a bad SAM. In accordance with an embodiment of the present invention, to correct for the bad SAM detection, the value in the STARTSEARCH register is temporarily set to equal 998 (i.e., 990+8=998), the value in the EXPECTSAM register is temporarily set to 1008 (i.e., 1000+8=1008), and the value in the TIMESEUP timeout register is temporarily set to 1018 (i.e., 1010+8=1008). If some of these values were stored in memory locations, they can be temporarily changed in memory. More generally, where/when to search for the next SAM is adjusted so that the search for the next SAM is based on the most recently detected good SAM(s), rather than being based on the detection characterized as a bad SAM. In this example, this enables the servo demodulator 404 to perform a good SAM detection at time t4, at which point the STARTSEARCH, EXPECTSAM and ENDSEARCH values are reset or returned to what they were at time t2, and the servo demodulator 404 maintains servo lock. More specifically, when the SAM pattern is detected (e.g., at time t4), and characterized as a good SAM detection, as a result of temporarily adjusting values (e.g., the values in the STARTSEARCH register, the EXPECTSAM register and the ENDSEARCH register, as explained above) these values are returned to their previous values (e.g., by subtracting 8 counts from each value or replacing the values with stored values).

In a similar manner, the present invention can be used to begin to search for the SAM pattern in the next servo wedge 138 at an earlier time/location, if a bad SAM detection occurs when the sector timer value is between the EXPECTSAM value and the ENDSEARCH value (but did not reach the ENDSEARCH value, which would cause free-wheeling).

Figure 8:
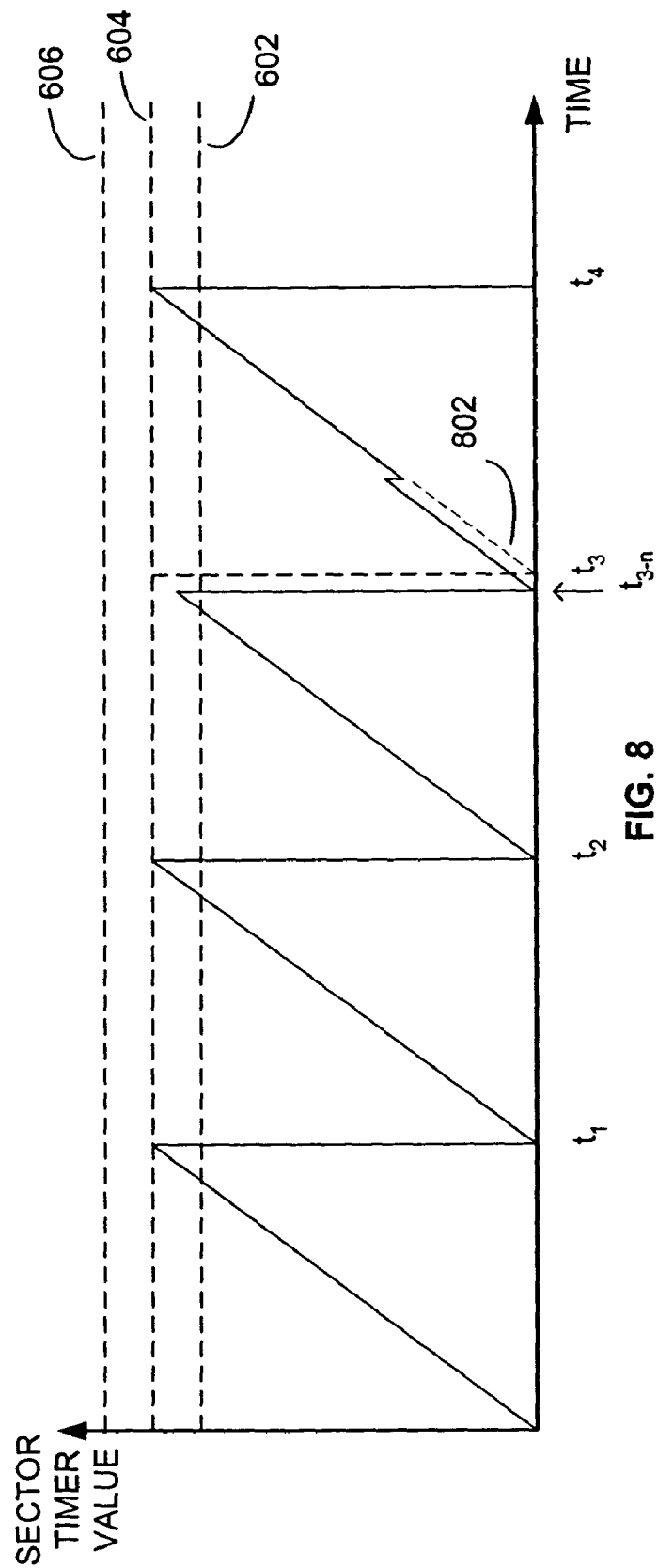
FIG. 8 is a timer value vs. time graph that is useful for explaining embodiments of the present invention wherein a timer is adjusted.

In accordance with other embodiments of the present invention, rather than adjusting values such as the STARTSEARCH, EXPECTSAM and ENDSEARCH values, a timer (e.g., sector timer or delay timer) is appropriately adjusted so that the search window for the next SAM pattern is effectively adjusted. This will now be described with reference to the Sector Timer Value vs. Time graph of FIG. 8. As in FIGS. 6 and 7, dashed line 602 represents the value of the sector timer 542 that triggers the SAM detector 532 to begin searching for a SAM (e.g., the STARTSEARCH value), dashed line 604 represents the value of the sector time at which the SAM is expected (e.g., the EXPECTSAM value), and dashed line 606 represents the ENDSEARCH value (i.e., the value of the sector timer 542 that will trigger a timeout condition).

In this example, the SAM pattern is detected at times t1 and t2 (assume these are good SAM detections). Additionally, the SAM pattern is detected at time t3-n, which is earlier than the next expected SAM time t3. As explained above and as shown in FIG. 8, conventionally the sector timer 542 is automatically reset to zero at time t3-n, whether a good SAM detection or a bad SAM detection occurred at time t3-n. Conventionally, this will cause the servo demodulator 404 to start searching for the next SAM at an earlier than appropriate time/location (because the sector timer 542 was reset to zero earlier than appropriate), which may result in another bad SAM detection, or missing the next SAM, in turn resulting in the servo demodulator 404 losing lock.

Now, assume that an embodiment of the present invention, as described above, is used to characterize the detection of the SAM pattern at time t3-n as a bad SAM detection. In accordance with an embodiment of the present invention, the SAM pattern in the next servo wedge 138 will be searched for based on when/where the previous SAM pattern was detected, which was characterized as a good SAM detection. Since in this example the sector timer 542 was already reset to zero, and has began counting, the searching for the next SAM based on a previous SAM detection (characterized as a good SAM detection) is accomplished by adjusting a timer (e.g., sector timer or delay timer). For example, assume that the stored STARTSEARCH value equals 990, the stored EXPECTSAM value equals 1000, and the stored ENDSEARCH value equals 1010. Also assume the SAM pattern, characterized as a bad SAM detection was detected when the sector timer value was 992, and that the previous SAM detection (characterized as a good SAM detection) occurred when the sector timer value was 1000. Thus, the bad SAM detection in this example occurred 8 sector timer counts earlier than the EXPECTSAM value (and thus the sector timer was reset 8 counts too early, and is therefore 8 counts greater than it should be). As just mentioned, one of the embodiments of the present invention, described above, is used to characterize the SAM detection at time t3–n as a bad SAM detection. In accordance with an embodiment of the present invention, to correct for the bad SAM detection, the value of the sector timer is adjusted (in this example, reduced by 8 counts) so that the bad SAM detection does not adversely affect the SAM search window. More generally, where/when to search for the next SAM is adjusted, by adjusting the timer, so that the search for the next SAM is based on the most recently detected SAM(s) that was characterized as a good SAM detection, rather than being based on the bad SAM. In this example, this enables the servo demodulator 404 to perform a good SAM detection at time t4, and the servo demodulator 404 maintains servo lock. In other words, in this example the timer is adjusted so that it is equal to what it would have been had the SAM pattern been detected at time t3 (in which case the timer would have been following dashed line 802).

In a similar manner, the present invention can be used to upwardly adjust the timer (i.e., to add counts to the timer), if a bad SAM detection occurs when the sector timer value is between the EXPECTSAM value and the END SEARCH value (but did not reach the ENDSEARCH value, which would cause free-wheeling).

Features of the embodiments of the present invention can be implemented primarily in software and/or in firmware (e.g., RAM, ROM, PROM and/or EPROM), or in combinations thereof. For example, where embodiments of the invention are to be used with an existing servo demodulator 404, firmware can be programmed to characterize a detected SAM pattern as either a good or a bad SAM detection, to adjust values used to search for the SAM pattern (e.g., the values in the STARTSEARCH register, the EXPECTSAM register and the ENDSEARCH register, or in memory as explained above), and/or to only update other control values (e.g., servo AGC and/or PLL values) following a good SAM detection. Firmware can also be programmed to overwrite erroneously updated servo AGC and/or PLL values with more appropriate previously determined values, in accordance with embodiment of the present invention.

Embodiment of the present invention can also be implemented primarily in hardware. As mentioned above, STARTSEARCH, EXPECTSAM, ENDSEARCH and TIMESUP load time values can be stored in registers. When a SAM detection is characterized as a bad SAM detection, the master state machine 532 or microprocessor 410 can write a specified bit (e.g., a zero) to a predetermined register. In accordance with an embodiment of the present invention, writing the specified bit to the predetermined register will cause the values in the STARTSEARCH and ENDSEARCH registers to be adjusted by an ADJUST value. According to an embodiment of the preset invention, the ADJUST value is equal to the actual SAM-to-SAM value (i.e., the value of the sector timer 542 when the SAM characterized as being bad was detected) minus the stored EXPECTSAM value. Prior to the bad SAM detection, assume the STARTSEARCH value (i.e., the value the in the STARTSEARCH register) is 990, the EXPECTSAM value is 1000, and the ENDSEARCH value is 1010. Also assume, for this example, that the SAM-to-SAM value is 993 when the SAM characterized as being bad is detected (i.e., the value of the sector timer 542 is 993 when the SAM characterized as being bad was detected), thereby causing the ADJUST value to equal −7 (i.e., 993−1000=−7). After the values in the STARTSEARCH and ENDSEARCH registers are adjusted by −7, the STARTSEARCH value becomes 997 (i.e., 990−−7=997) and the ENDSEARCH value becomes 1017 (i.e., 1010−−7=1017). In another example, assume that the SAM-to-SAM value is 1005 when the SAM characterized as being bad is detected. This will cause the ADJUST value to equal 5 (i.e., 1005−1000=5). After the values in the STARTSEARCH and ENDSEARCH registers are adjusted by 5, the STARTSEARCH value becomes 985 (i.e., 990−5=985) and the ENDSEARCH value becomes 1005 (i.e., 1010−5=1005). Such adjustments to the STARTSEARCH and ENDSEARCH registers will assist the servo demodulator 404 with performing a good SAM detection in the next servo wedge 138, even though a bad SAM detection occurred in the current servo wedge 138.

In accordance with another embodiment of the present invention, STARTSEARCH, EXPECTSAM, ENDSEARCH and TIMESUP load time values can be stored in memory. Then, writing a specified bit to the predetermined location in memory will cause the values in the STARTSEARCH and ENDSEARCH registers to be adjusted by an ADJUST value, in a manner similar to that just explained above.

Figure 9:
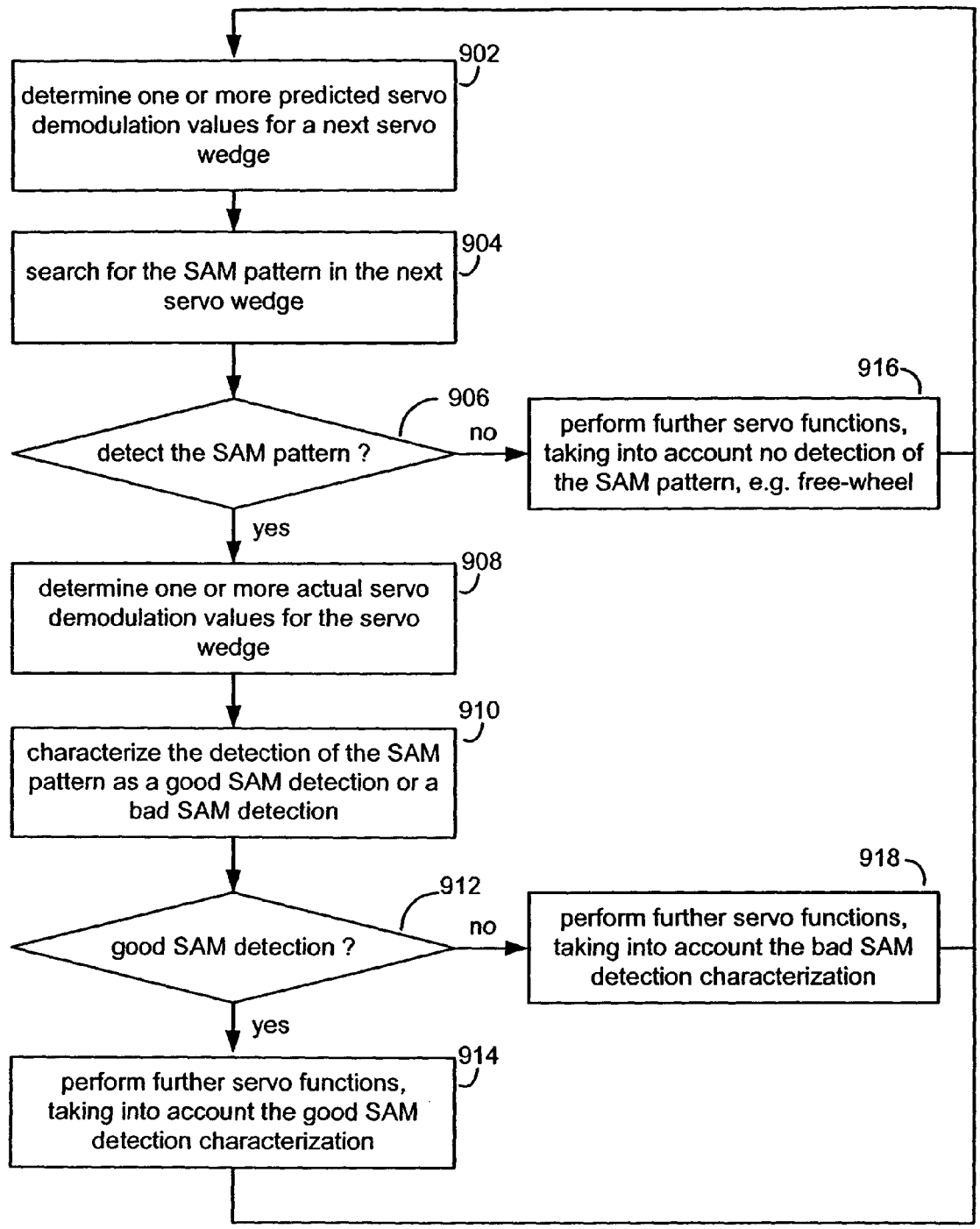
FIG. 9 is a high level flow diagram that summarizes various embodiments of the present invention in which a detection of a SAM pattern is characterized as a good or a bad SAM detection.

Many embodiments of the present invention, discussed above, can be summarized in the flow chart of FIG. 9. Referring to FIG. 9, at a step 902, one or more predicted servo demodulation values are determined for a next servo wedge. For example, the one or more predicted servo demodulation values can include one, a plurality, or a range of wedge number, track number, burst amplitude, and/or PES value(s).

At a step 904, the SAM pattern is searched for in the next servo wedge. If the SAM pattern is not detected in the servo wedge (i.e., if the answer to the decision 906 is no), then further servo functions are performed taking into account no SAM detection, as specified at a step 916. This can include, for example, free-wheeling to attempt to detect the SAM pattern in the following servo wedge. This can also include halting reading data from and writing data to data fields that follow the servo wedge. This can further include, using the one or more predicted servo demodulation values for servo control.

If the SAM pattern is detected in the servo wedge (i.e., if the answer to decision 906 is yes), then one or more actual servo demodulation values are determined for the servo wedge, at a step 908. Then, at a step 910, the detection of the SAM pattern is characterized as a good SAM detection or a bad SAM detection. As explained above, this can be accomplished by comparing the actual servo demodulation value(s) to the predicted servo demodulation value(s). Alternatively, or additionally, other factors, such as the extent that an actual SAM-to-SAM value (associated with a detected SAM pattern) differs from an EXPECTSAM value, and/or confidence determinations, can be used to characterize a detection of the SAM pattern as a good or a bad SAM detection.

If the detection of the SAM pattern is characterized as a bad SAM detection (i.e., if the answer to decision 912 is no), then further servo functions are performed, taking into account the bad SAM detection characterization, as specified at a step 918. For example, this can include halting reading data from and writing data to data fields that follow the servo wedge. This can also include, using the one or more predicted servo demodulation values for servo control, since the actual servo demodulation values are likely garbage. Additionally, where or when to search for the SAM pattern in the following servo wedge can be appropriately adjusted, as explained in detail above.

If the detection of the SAM pattern is characterized as a good SAM detection (i.e., if the answer to decision 912 is yes), then further servo functions are performed, taking into account the good SAM detection characterization, as specified at a step 914. For example, this can include reading data from and writing data to data fields that follow the servo wedge. This can also include, using the one or more actual servo demodulation values for servo control, since the actual servo demodulation values are likely good. Additionally, where or when to search for the SAM pattern in the following servo wedge can be based on where or when the SAM pattern was just detected (e.g., the center of the next SAM search window can be based on the just determined SAM-to-SAM time).

Searching for More Than One Occurrence of the SAM Pattern in a Single Servo Wedge Conventionally, if a bad SAM detection occurs within a servo wedge 138, a servo demodulator will not perform a good SAM detection within that same servo wedge, even if a good SAM pattern exists later within that same servo wedge. For example, if a servo demodulator performs a bad SAM detection near the beginning of a search window, a conventional servo demodulator will not detect a good SAM pattern that is also present in the servo wedge. This is because conventional servo demodulators do not search for more than one SAM pattern within a single servo wedge. Embodiments of the present invention, as described below, search for more than one SAM pattern within a single servo wedge, and select which SAM detection (if any) is a good SAM detection. In this manner, further servo functions (e.g., servo control) can be performed using servo demodulation values associated with a good SAM detection (or a best good SAM detection, if there is more than one good SAM detection).

In accordance with embodiments of the present invention, portions of the servo demodulator 404 (or the entire servo demodulator 404, or portions of or the entire servo demodulator 404 and portions of the read/write path 412) are duplicated so that more than one SAM pattern can be searched for within a single servo wedge. For example, two servo field detectors 430 (each including a SAM detector 532) can each search for the SAM pattern within a single servo wedge. When the first servo field detector 430 detects the SAM pattern, the second servo field detector 430 will suppress or ignore that the SAM pattern was detected and will continue to search for the SAM pattern in the remaining portion of the servo wedge (as defined by the remaining portion of the search window). If the second servo field detector 430 also detects the SAM pattern, a determination is made as to which SAM detection (if any) is a good SAM detection. If both SAM detections are characterized as a good SAM detection, then a best good SAM detection can be selected, as described below.

If no SAM detection is characterized as a good SAM detection, then the SAM pattern in the next servo wedge 138 can be searched for based on the one or more previous characterized good SAM detections. Additionally, if no SAM detection is characterized as a good SAM detection (or if there is no SAM detection at all within a servo wedge 138), then the microprocessor 410 can use predicted servo demodulation values for servo control (e.g., for control of the VCM 418).

Embodiments of the present invention are not meant to be limited to searching for only two of the SAM patterns within a single servo wedge. For example, further servo field detectors 430 can be provided to search for additional occurrences of the SAM pattern within a single servo wedge.

Servo demodulation values (e.g., a track number value, a wedge number value, a burst value and/or a PES value) can be determined for each SAM pattern detected within a servo wedge 138. Then, each SAM pattern detection can be characterized as a good SAM detection or a bad SAM detection. If only one good SAM detection occurs in the servo wedge 138, the servo demodulation values associated with the good SAM detection are used for servo control (e.g., used in servo control algorithms). Additionally, where or when to search for the SAM pattern in the next servo wedge 138 is based on when/where the one good SAM detection occurred.

If more than one good SAM detection occurs in the servo wedge 138, then a "best" good SAM detection can be selected. Selection of the best good SAM detection can be based on which SAM detection corresponds to one or more actual servo demodulation values that are closest to one or more predicted servo demodulation values. The servo demodulation values associated with the best good SAM detection can be used for servo control (e.g., used in servo control algorithms). In summary, the one or more actual servo demodulation values associated with the best good SAM detection (or the only good SAM detection) are used for servo control (e.g., for control of the VCM 418). If there is no good SAM detection (or no SAM detection at all), the one or more predicted servo demodulation values can be for servo control.

In accordance with other embodiments of the present invention, the servo demodulator 404 searches for more than one SAM pattern in a single servo wedge 138 without duplicated portions of the servo demodulator 404 (or minimizing the portions that are duplicated). For example, a single servo field detector 430 (including a single SAM detector 532) can search for multiple occurrences of the SAM pattern within a single servo wedge 138. Each time the SAM detector 532 detects the SAM pattern in a servo wedge 138, it informs the microprocessor 410 and/or master state machine 532 of the detection, and continues to search for additional occurrences of the SAM pattern. Each time the SAM detector 532 detects the SAM pattern, the track number detector 534 and burst demodulator 536 generate servo demodulation values that correspond to the detected SAM pattern. The microprocessor 410 can keep track of the multiple SAM pattern detections and corresponding servo demodulation values (which may be stored in registers or memory), and then select which SAM detection (if any) is a good (or best good) SAM detection. The microprocessor 410 can then use the appropriate servo demodulation values (whether actual or predicted) for servo control. Further, the microprocessor 410 can appropriately adjust the SAM search window for the next servo wedge 138 (e.g., by adjusting STARTSEARCH and ENDSEARCH values) based on a good (or a best good) SAM detection, or based on a previous good SAM detection if there is no SAM detection or no good SAM detection for the current servo wedge.

In accordance with embodiments of the present invention, the servo subpart field following a detected SAM pattern (e.g., the wedge number field) is immediately demodulated and compared to one or more predicted values to characterize the SAM detection as a good or a bad SAM detection. As soon as the detection is determined to be a bad SAM detection, no additional demodulation associated with that SAM detection occurs. This increases the efficiency of demodulator and microprocessor resources.

In accordance with embodiment of the present invention, servo demodulation values are only stored in registers if they correspond to a SAM pattern detection that is characterized as a good SAM detection. This enables more efficient use of register space. However, in alternative embodiments servo demodulation values are stored prior to SAM detections being characterized as good or bad detections. Then, decisions of whether or not to use the stored servo demodulations values are made based on the characterizations of the SAM detections.

Figure 10:
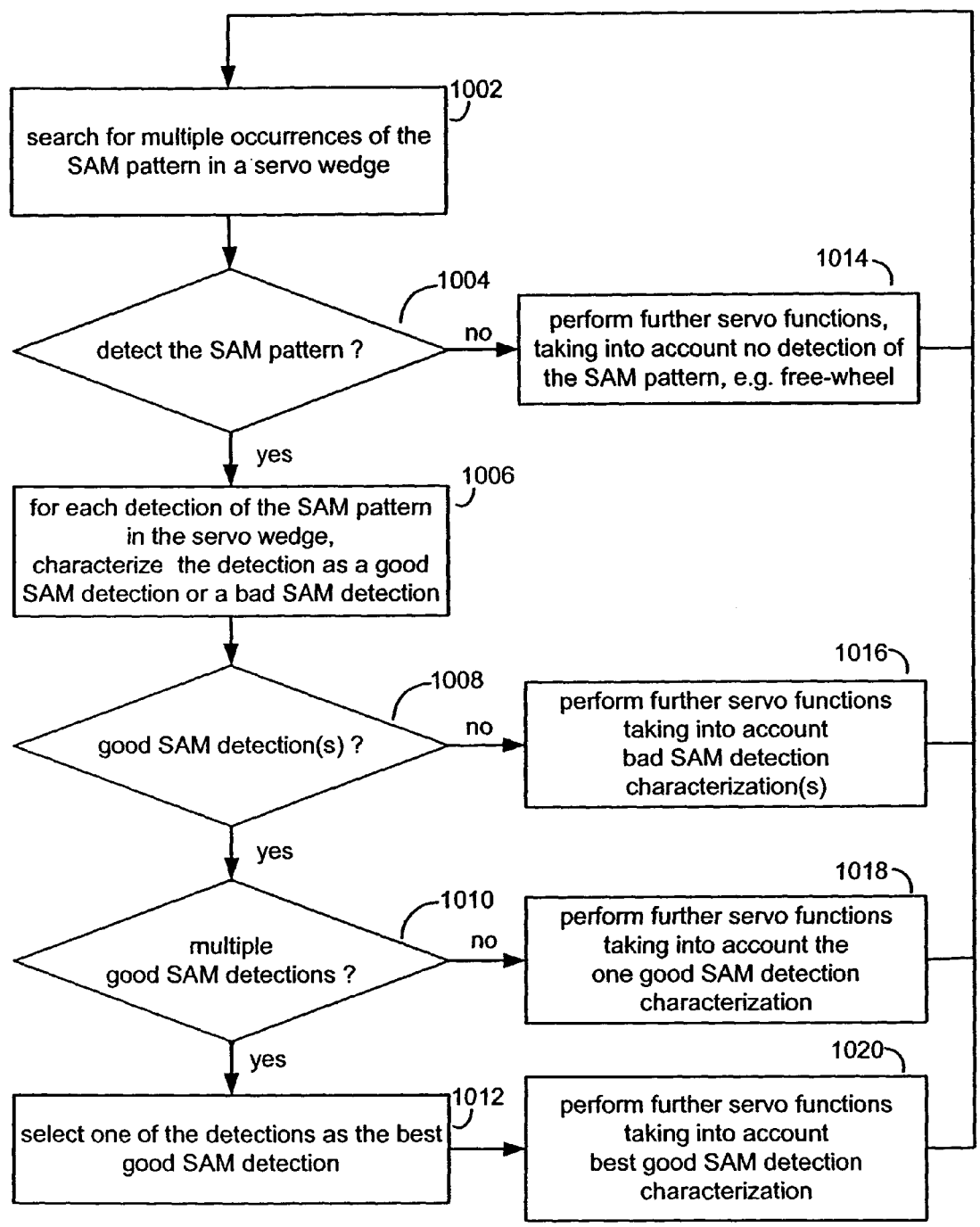
FIG. 10 is a high level flow diagram that summarizes various embodiments of the present invention that search for multiple occurrences of a SAM pattern in a single servo wedge.

Many embodiment of the present invention, discussed above, can be summarized in the flow chart of FIG. 10. Referring to FIG. 10, at a step 1002, multiple occurrences of the SAM pattern are searched for in a servo wedge. As explained above, the servo demodulator 404 can include duplicated portions (e.g., two servo field detectors 430) to perform this step. Alternatively, the servo demodulator 404 can search for multiple occurrences of the SAM pattern, without needing duplicated portions.

If the SAM pattern is not detected in the servo wedge (i.e., if the answer to decision 1004 is no), the further servo functions are performed, taking into account no detection of the SAM pattern. This can include, for example, freewheeling to attempt to detect the SAM pattern in the following servo wedge. This can also include halting reading data from and writing data to data fields that follow the servo wedge. This can further include, using the one or more predicted servo demodulation values for servo control.

Each detection of the SAM pattern is characterized as a good SAM detection or a bad SAM detection, at a step 1006. Various embodiments of the present invention, described above, can be used to perform these characterizations. For example, this can be accomplished by comparing one or more actual servo demodulation value(s) to one or more predicted servo demodulation value(s). Alternatively, or additionally, other factors, such as the extent that an actual SAM-to-SAM value (associated with a detected SAM pattern) differs from an EXPECTSAM value, and/or confidence determinations, can be used to characterize each detection of the SAM pattern as a good or a bad SAM detection.

If no detection of the SAM pattern is characterized as a good SAM detection (i.e., if the answer to decision 1008 is no), then further servo functions are performed, taking into account a bad SAM detection(s) characterization(s), as specified at a step 1016 For example, this can include halting reading data from and writing data to data fields that follow the servo wedge. This can also include, using one or more predicted servo demodulation values for servo control, since the actual servo demodulation values are likely garbage. Additionally, where or when to search for the SAM pattern in the following servo wedge can be appropriately adjusted, as explained in detail above.

If only one detection of the SAM pattern is characterized as a good SAM detection (i.e., if the answer to decision 1010 is no), then further servo function are performed, taking into account the one good SAM detection characterization, as specified at a step 1018. For example, this can include reading data from and writing data to data fields that follow the servo wedge. This can also include, using the one or more actual servo demodulation values for servo control, since the actual servo demodulation values are likely good. Additionally, where or when to search for the SAM pattern in the following servo wedge can be based on where or when the SAM pattern was just detected (e.g., the center of the next SAM search window can be based on the just determined SAM-to-SAM time).

If multiple detections of the SAM pattern are characterized as good SAM detections (i.e., if the answer to decision 1010 is yes), then one of the detections is selected as a best good SAM detection, at a step 1012. As explained above, selection of the best good SAM detection can be based on which SAM detection corresponds to one or more actual servo demodulation values that are closest to one or more predicted servo demodulation values.

After one of the SAM detections is selected as a best good SAM detection, further servo functions are performed, taking into account the best good SAM detection characterization, as specified at a step 1020. For example, the servo demodulation values associated with the best good SAM detection can be used for servo control (e.g., used in servo control algorithms). Additionally, where or when to search for the SAM pattern in the following servo wedge can be based on where or when the SAM pattern (characterized as the best good SAM pattern) was just detected. In accordance with an embodiment, data can be written to and/or read from data fields that follow the servo wedge. In an alternative embodiment, the fact the two occurrences of the SAM pattern were characterized as good SAM detections can indicate that there is not enough confidence to write to and/or read from data fields that follow the servo wedge. In still another embodiment, if the two good SAM detections are too closely matched (i.e., one is not much better than the other), then there is not enough confidence to write to and/or read from data fields that follow the servo wedge. However, if one of the good SAM detection is much better (e.g., the SAM detection is associated with actual demodulation values much closer to the predicted values), then data can be written to and/or read from data fields that follow the servo wedge.

Correcting PLL and/AGC Values After a Bad or Missed SAM Detection

As discussed above, a bad servo signal (e.g., caused by a single bad servo wedge 138) can cause the servo AGC and/or PLL values that are stored in registers or memory, to be corrupted. As also explained above, servo AGC and/or PLL values are stored so that values determined while reading one servo wedge 138 can be used as the starting values for reading a next servo wedge 138. Alternatively, servo AGC and/or PLL values that are determined and stored from one servo wedge 138 can be used to predict starting values for reading a next servo wedge 138. If corrupted values are used as starting values (or to predict starting values) when the next servo wedge 138 is read, it is possible that it will take at least the entire next servo wedge 138 for the servo AGC 428 and/or the servo PLL 426 to recover, causing the SAM in the next servo wedge 138 to be missed. This in turn can cause the servo demodulator 404 to completely lose lock. When this occurs, the whole concept, of having what is learned from one servo wedge 138 influencing how a next wedge 138 is read, backfires. Embodiments of the present invention, which are now described, reduce the likelihood, and hopefully prevent, the servo AGC 428 and the servo PLL 426 from retrieving and using garbage values after a bad SAM detection or missed SAM detection (i.e., no SAM detection) occurs. These embodiments use the knowledge that a bad SAM detection characterization or missed SAM detection occurred in a servo wedge 138, to indicate that it is likely that the servo AGC and servo PLL values during that servo wedge 138 are garbage (i.e., corrupted).

In accordance with embodiments of the present invention, discussed with reference to FIG. 11A, stored servo AGC and/or PLL values are only updated following a good SAM detection. Thus, if a SAM detection is characterized as a bad SAM detection, the AGC and/or servo PLL values stored in registers or memory are not updated with the values just determined by the servo AGC 428 and servo PLL 426. In other embodiments, discussed with reference to FIG. 11B, servo AGC and/or PLL values are stored for each servo wedge, but the just stored values are only used as starting values (or to predict starting values) for the next servo wedge following a good SAM detection (otherwise, previously stored servo AGC and/or PLL values are used as starting values, or used to predict the starting values). For example, before new servo AGC and/or PLL values are stored for a present servo wedge 138, the values being overwritten are stored in another location (e.g., in other registers or memory locations). Then, if the SAM detection for that servo wedge 138 is later characterized as a bad SAM detection, the previous servo AGC and/or PLL values can be restored. In each embodiment, when a next servo wedge 138 is read (following a servo wedge 138 where a bad SAM detection characterization occurred), the starting values for servo AGC 428 and/or PLL 426 will most likely not be garbage, thereby reducing the likelihood that the servo demodulator 404 will lose lock.

A particularly useful application of retaining AGC and/or PLL values from one wedge to the next is with media-written disks, where mis-centering of disks that are written outside of a disk drive may cause approximately ±1% (max) frequency variation. Embodiments of the present invention can be used to improve the performance of disk drives using media-written disks. In such a case, a prediction of the appropriate PLL value for a next servo wedge can be determined as a function of the values saved from a previous wedge (one for which a good SAM detection occurred), the known eccentricity of the disk, and the number of wedges since that good SAM detection occurred.

Figure 11A:
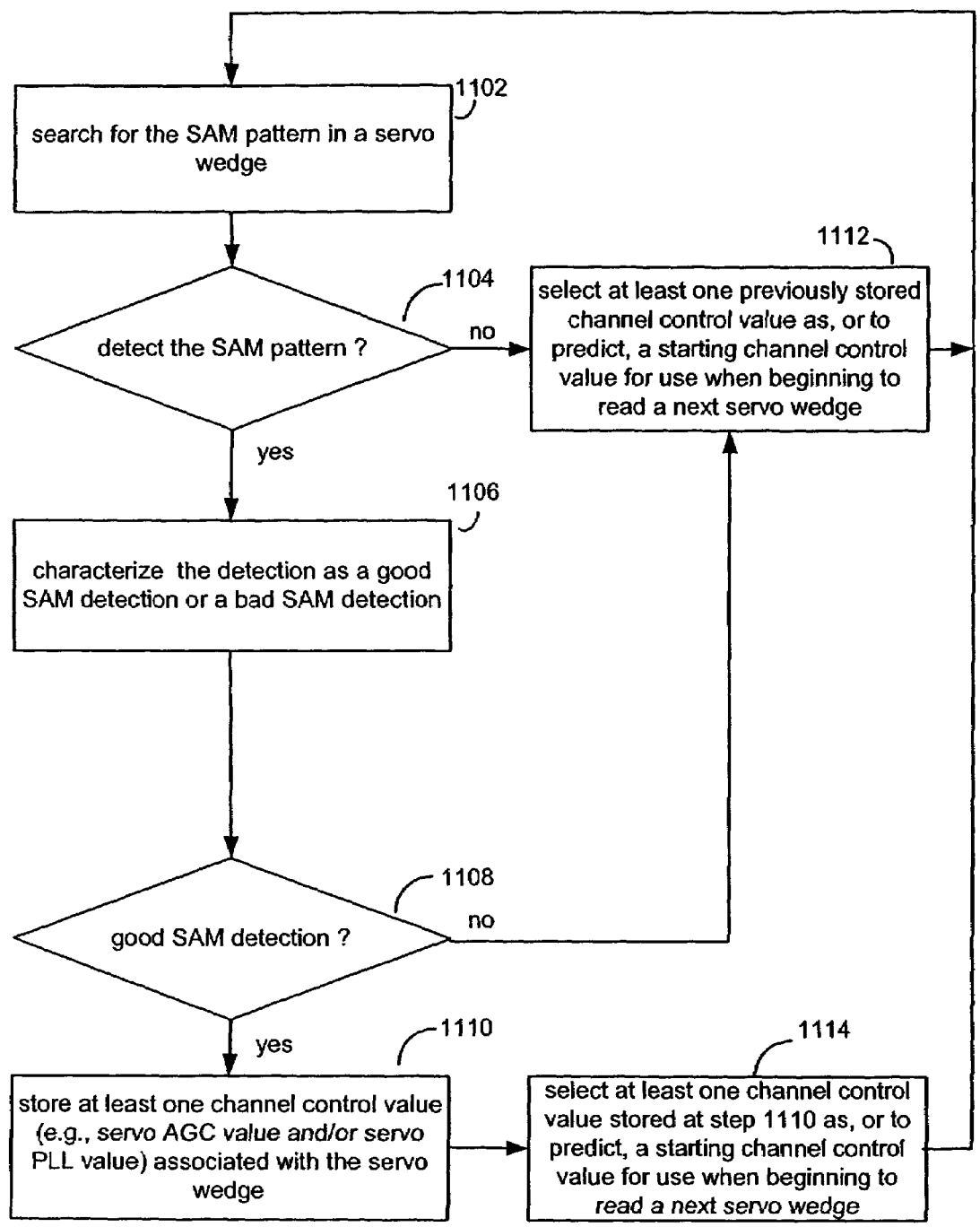
FIGS. 11A and 11B are high level flow diagrams that summarize various embodiments of the present invention in which characterizations of SAM pattern detections are used to decide which channel control values to use when beginning to demodulate a next servo wedge.

Many embodiment of the present invention, discussed above, can be summarized in the flow chart of FIG. 11A. Referring to FIG. 11A, at a step 1102, the SAM pattern is searched for in a servo wedge. If the SAM pattern is not detected in the servo wedge (i.e., if the answer to decision 1104 is no), then one or more previously stored (or predicted based on previously stored) channel control values are used as starting values when reading a next servo wedge, as specified at a step 1112. The channel control values can be servo AGC and/or PLL values, as explained above. By using previously stored (or predicted based on previously stored) channel control values following a missed SAM detection (i.e., no SAM detection), garbage values will not be used for servo AGC, PLL, and the like, reducing the likelihood the servo demodulator 404 will lose lock, as explained above. Channel control values can be predicted, for example, based on a plurality of previously determined values. Simple averaging algorithms can be used, or more complex state space estimations can be used. For example, a starting PLL value can be predicted based on the PLL value stored for the most recent wedge wherein a good SAM detection occurred, the known eccentricity of the disk, and the number of wedges since that good SAM detection occurred.

If the SAM pattern is detected in the servo wedge (i.e., if the answer to decision 1104 is yes), then the detection is characterized as a good or a bad SAM detection, at a step 1106. Various embodiments for characterizing the detection of the SAM pattern are explained in detail above. For example, this can be accomplished by comparing the actual servo demodulation value(s) to the predicted servo demodulation value(s). Alternatively, or additionally, other factors, such as the extent that an actual SAM-to-SAM value (associated with a detected SAM pattern) differs from an EXPECTSAM value, and/or confidence determinations, can be used to characterize a detection of the SAM pattern as a good or a bad SAM detection.

If the detection of the SAM pattern is characterized as a bad SAM detection (i.e., if the answer to decision 1108 is no), then one or more previously stored (or predicted based on previously stored) channel control values are used as starting values when reading a next servo wedge, as specified at step 1112. By using previously stored (or predicted based on previous stored) channel control values following a SAM detection characterized as a bad SAM detection, garbage values will not be used for servo AGC, PLL, and the like, reducing the likelihood the servo demodulator 404 will lose lock, as explained above.

If the detection of the SAM pattern is characterized as a good SAM detection (i.e., if the answer to decision 1108 is yes), then the channel control values determined for a servo wedge are stored, as specified at a step 1110. The just stored one or more channel control values are then used as starting values (or to predict starting values) when reading the next servo wedge, as specified at a step 1114.

Figure 11B:
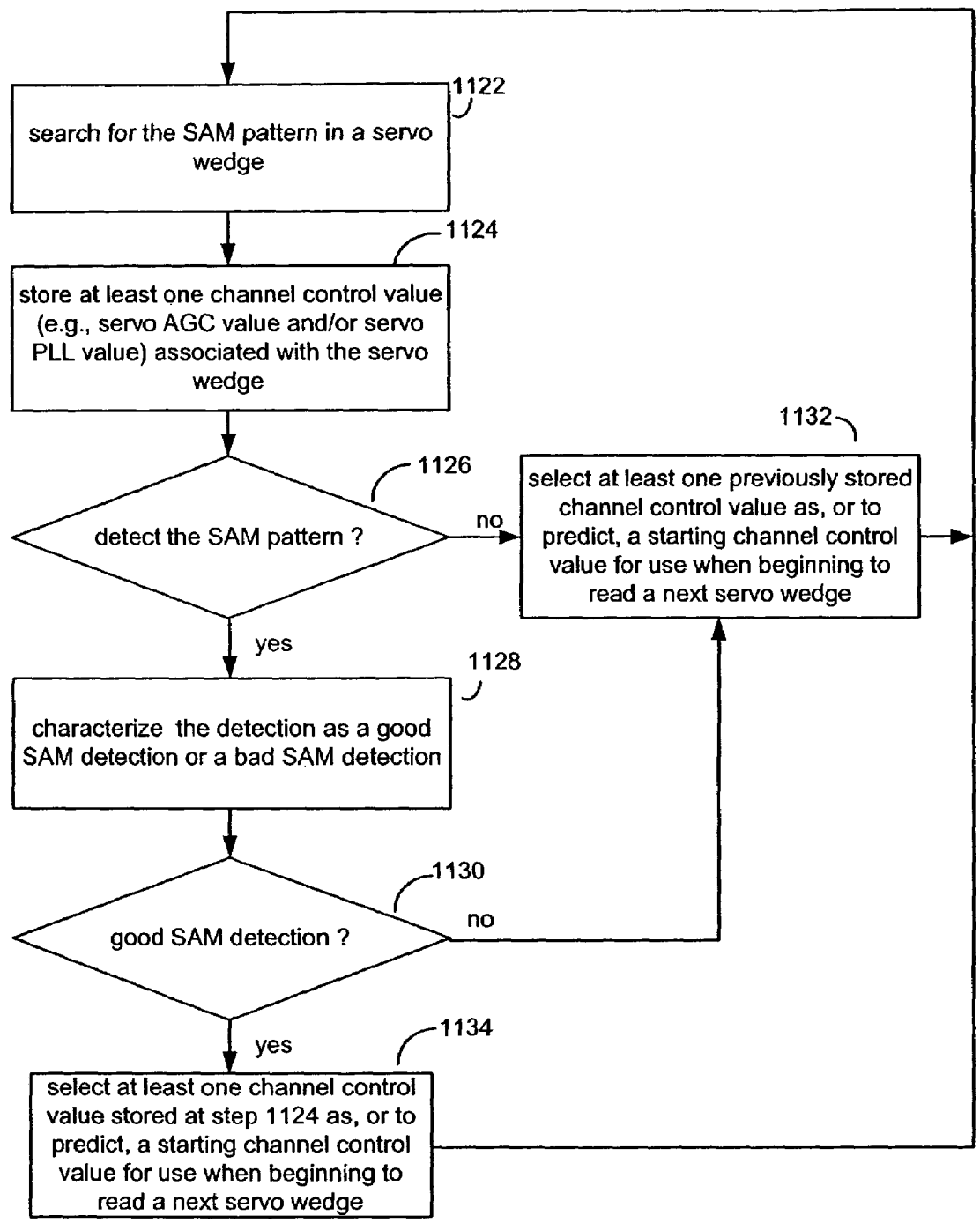

Other embodiments of the present invention, discussed above, can be summarized in the flow chart of FIG. 11B. Referring to FIG. 11B, at a step 1122, the SAM pattern is searched for in a servo wedge. At a step 1124, one or more channel control values are stored for the wedge just searched, regardless of whether a SAM pattern was detected. (Steps 1122 and 1124 can be reversed, so that channel control values are only stored if a SAM pattern was detected, regardless whether the SAM detection was characterized as good or bad.) If the SAM pattern is not detected in the servo wedge (i.e., if the answer to decision 1126 is no), then one or more previously stored (or predicted based on previously stored) channel control values are used as starting values when reading a next servo wedge.

If the SAM pattern is detected in the servo wedge (i.e., if the answer to decision 1126 is yes), then the detection is characterized as a good or a bad SAM detection at a step 1128. If the detection of the SAM pattern is characterized as a bad SAM detection (i.e., if the answer to decision 1130 is no), then one or more previously stored (or predicted based on previously stored) channel control values are used as starting values when reading a next servo wedge, as specified at a step 1132. If the detection of the SAM pattern is characterized as a good SAM detection (i.e., if the answer to decision 1130 is yes), then the just stored one or more channel control values are used as starting values (or to predict starting values) when reading a next servo wedge, as specified at a step 1134.

Zone Bit Recorded Servo Wedges

Hard disk drive capacity and speed have been improved through the use of zone bit recording (also known as constant density recording, multiple zone recording, or simply as zone recording), which takes advantage of the longer outer tracks on a disk. Each of the above discussed embodiments can be used with conventional modern zone bit recorded disks. However, many of the above discussed embodiments can be further optimized for use with zone bit recorded disks that include zone bit recorded servo wedges, as will be described below.

As can be appreciated from FIG. 1, tracks close to the outer diameter of disk 110 are much longer than tracks close to the inner diameter. Because there is a limit on the number of bits that can be packed into the tracks near the inner diameter of a disk, the outer tracks were conventionally recorded with the same number of sectors by reducing their bit density. This underutilized the outer tracks.

To better utilize the outer tracks, modern hard disk drives use zone bit recording. In zone bit recording, disk capacity is increased through bit density management. This is accomplished by dividing each disk into concentric circumferential zones and changing the nominal clock rate (i.e., and thus, read and write frequency) as the read/write head(s) moves from one zone to another. Each track within a given zone contains a constant number of data sectors. However, the number of sectors per track is different for different zones, with the inner most zone including the fewest sectors and the outermost zone including the greatest number of sectors. This allows more efficient use of the longer tracks near the outer diameter of a disk, permitting more nearly equal areal density of data across the radius of the disk.

Figure 12:
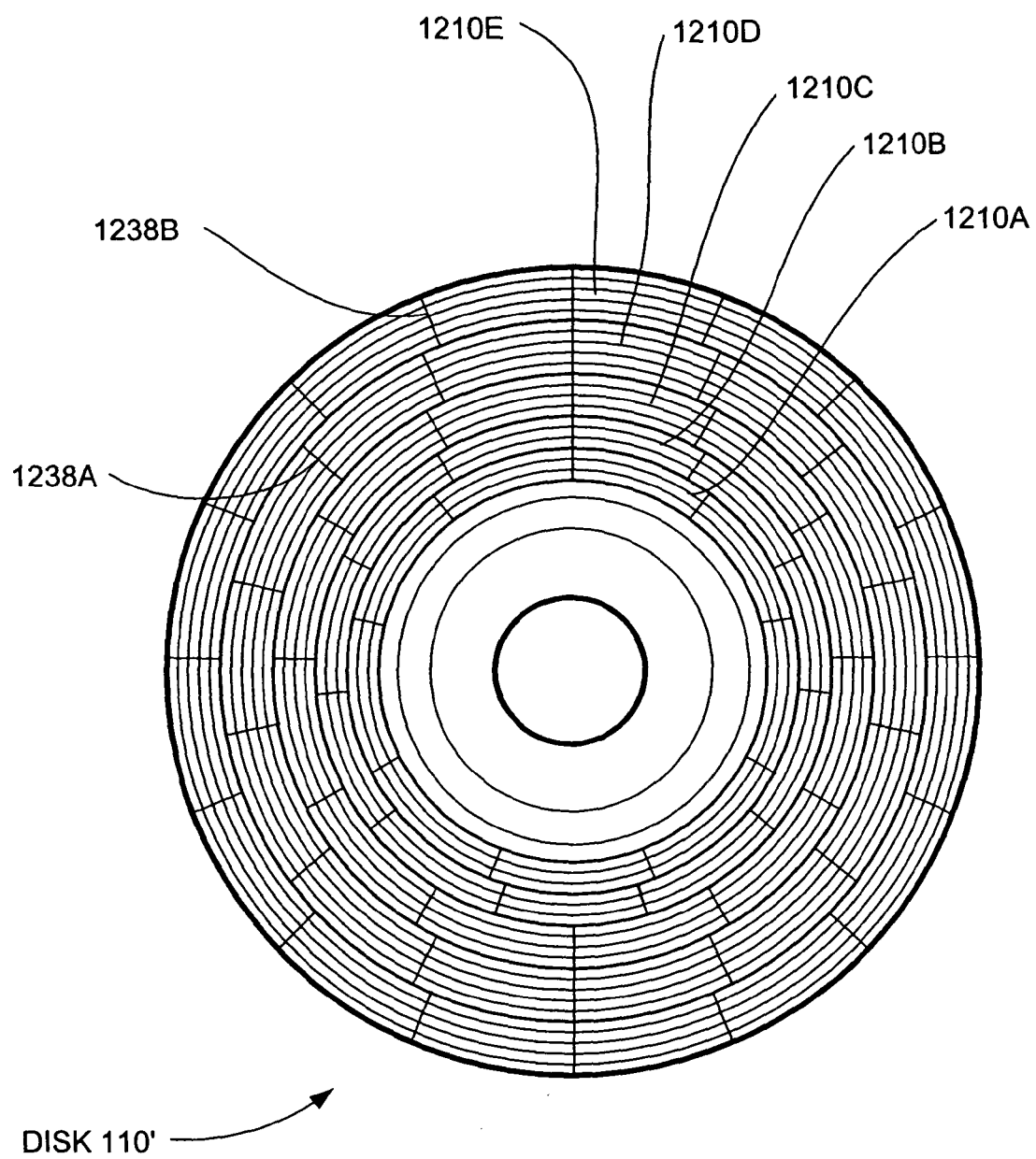
FIG. 12 is a plan view of an exemplary rotatable storage disk 110' that is zone bit recorded.

FIG. 12 is a plan view of an exemplary rotatable storage disk 110' that is zone bit recorded. The disk 110' is shown as being dividing into five concentric circumferential zones 1210A, 1210B, 1210C, 1210D and 1210E. Each track within a given zone contains a constant number of data sectors. For example, the inner most zone 1210A is shown as including nine data sectors, and the outer most zone 1210E is shown as including sixteen data sectors. For ease of illustration, the servo wedges in FIG. 12 are simply represented by radial line (e.g., lines 1238A and 1238B). In disk 110', from zone to zone, there are a different number of servo wedges around a track. Also, in disk 110', each pair of adjacent data sectors is shown as being separated from one another by a servo wedge. However, it is likely that at least some servo wedges will split data-sectors (and thus, the number of servo wedges need not be related to the number of data sectors). Further, the number of zones, the number of servo wedges per revolution, and the number of sectors per zone are merely exemplary. For example, it is more likely that an outer most zone will include between about 200 to 300 data sectors per track, and an inner most zone will include between about 100 to 150 data sectors per track, but of course can be more or less.

Even though most modern disk drives use zone bit recorded disks, modern disks drives do not use zone bit recorded servo wedges. Rather, modern disk drives sample at two different frequencies during the same track, one frequency for data fields, and a second frequency for servo wedges. This has been accomplished using two channels, or one channel essentially operating as two channels by switching between servo and data modes. Thus, even though the frequency associated with the data fields in modern disk drives is dependent on which zone the data field is within, the frequency associated with all of the servo wedges is the same, regardless of which zone the servo wedge is in.

Servo wedges typically include the information that can be used to determine what frequency to use when demodulating the intermittent data fields. It is believed that a main reason why servo wedges are not currently being zone bit recorded is because it is difficult to demodulate a servo wedge unless the appropriate demodulation frequency is known beforehand. However, there would be many advantages to zone bit recording the servo wedges. First, the size of a majority of the servo wedges would be reduced if the servo wedges were zone bit recorded, leaving more room for data fields that store user data. Further, channels, such as partial response maximum likelihood (PRML) channels, would likely operate better because there would be a more nearly constant known pulse shape, relative to the channel's sampling, in the wedges. This is in part because with non-zone bit recorded servo wedges, the frequency used to sample servo wedges is constant from the inner diameter (ID) to the outer diameter (OD) of the disk, causing the sample pulse shapes as observed in time to vary significantly from the ID to the OD, because of the difference in circumference. Zone bit recorded servo wedges will allow the servo data rate to be scaled with the circumference, thereby making it easier to achieve the proper pulse shape.

However, despite the advantages that can be achieved by zone bit recorded servo wedges, the inventor of the present invention is unaware of any scheme that has been successfully commercialized for demodulating zone bit recorded servo wedges.

Figure 13:
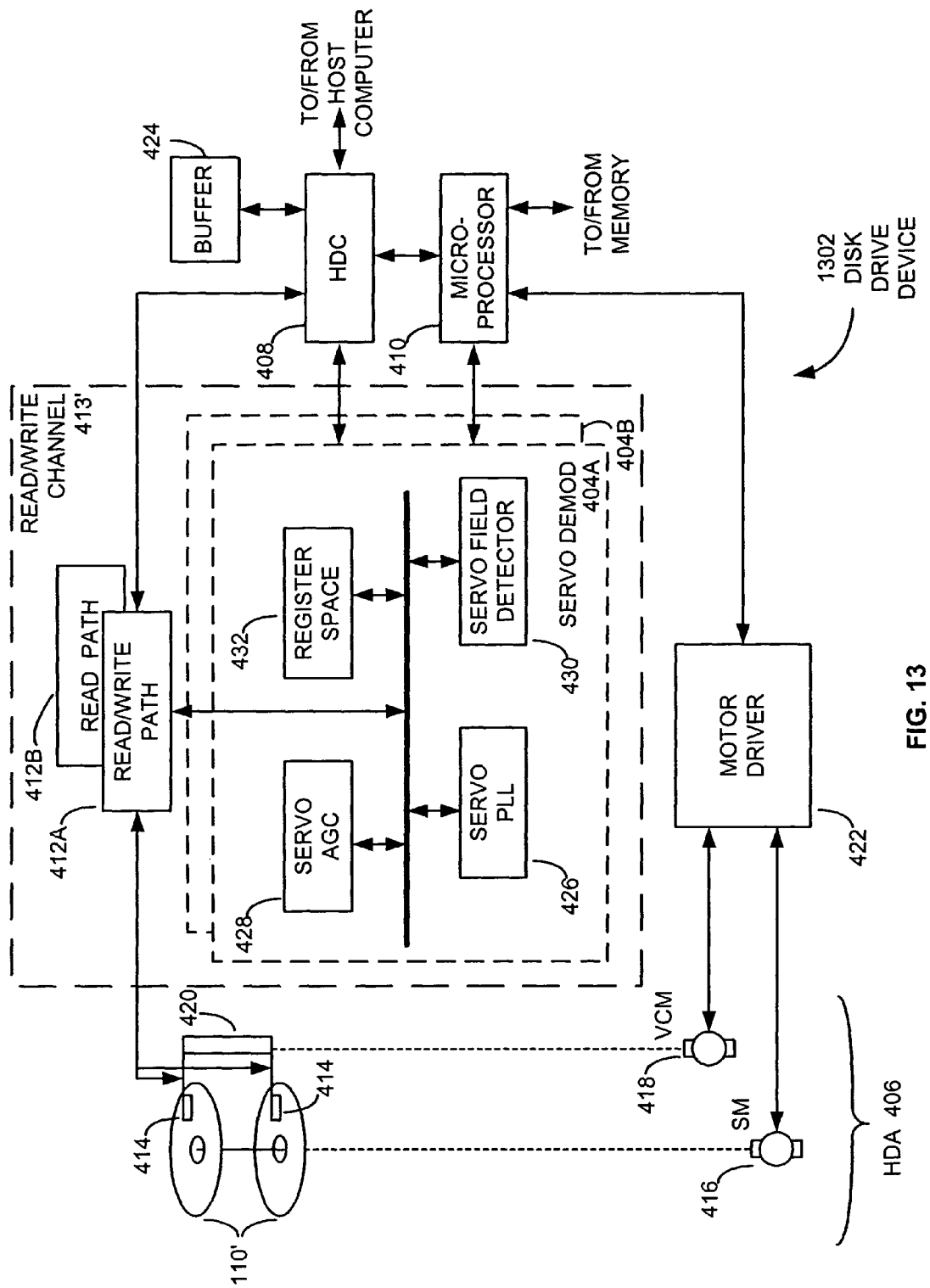
FIG. 13 is a high level diagram of an exemplary disk drive device 1302, which can implement embodiments of the present invention.

FIG. 13 illustrates an embodiment of the present invention that can be used with one or more disks that include zone bit recorded servo wedges. A zone bit recorded disk including zone bit recorded servo wedges may resemble disk 110' shown in FIG. 12, where there are a different number of servo sectors around a track from zone to zone. Alternatively, a zone bit recorded disk including zone bit recorded servo wedges can include the same number of wedges in each zone, with the circumferential location of each zone bit recorded servo wedge being generally the same from zone to zone. Thus, servo wedges in adjacent zones are adjacent one another. Further, in this embodiment each zone includes the same number of servo wedges, with the outer most zone including the most number of servo wedges and the inner most zone including the least number of servo wedges. Other arrangements are of course also possible.

More specifically, FIG. 13 is a high level diagram of an exemplary disk drive device 1302, which can implement embodiments of the present invention. Disk drive device 1302 includes similar elements to those discussed above in relation to FIG. 4, and thus, similar numbering is used. However, in disk drive 1302, the read/write channel 413' includes a pair of servo demodulators 404A and 404B, and a pair of paths 412A and 412B. This can alternatively be thought of a pair of channels 413 (e.g., a channel 413A and a channel 413B).

So long as the zone location (i.e., which zone) of a head is know at a first point in time, it is relatively easy for the microprocessor to narrow down which zone the head will be in, at a next point in time, to two zones. For example, referring back to FIG. 12, if the head 414 is known to be in (or more specifically, over) the inner most zone 1210A during a first point in time t1, it can be predicted that the head 414 will either still be in the first zone 1210A or will be in the adjacent second (i.e., the next most inner) zone 1210B at a second point in time t2, assuming the difference between times t1 and t2 is sufficiently small. For another example, if the head is known to be in the second zone 1210B during a time t3, and to be moving radially outward from a point in time t3 to a point in time t4, it can be predicted that the head 414 is either still within the second zone 1210B or within the adjacent third zone 1210C at time t4, assuming the difference between times t3 and t4 is sufficiently small. The difficulty is in determining in which of the two most likely zones the head 414 is actually located.

Referring back to FIG. 13, the microprocessor 410 uses logic or state space estimation similar to that just described above to narrow down the location of the head 414 to two adjacent zones. The microprocessor then instructs one of the paths and one of the servo demodulators (e.g., 412A and 404A) to search for a SAM pattern at a first nominal frequency that corresponds to one of the two predicted zones; and the other path and servo demodulator (e.g., 412B and 404B) are instructed to search for the SAM pattern at a second nominal frequency that corresponds to the other one of the two predicted zones. Then, the location of the head 414 (and the appropriate frequency) is determined based on which servo demodulator is able to detect the SAM pattern, or even better, which servo demodulator achieves a SAM detection that is characterized as a good SAM detection. For example, if servo demodulator 404A (while operating at a first nominal frequency) detects the SAM and it is characterized as a good SAM detection, then it is determined that the head 414 is located over the zone associated with the first nominal frequency. If servo demodulator 404B (while operating at a second nominal frequency) detects a SAM that is characterized as a good SAM detection, then it is determined that the head 414 is located over the zone associated with the second nominal frequency.

Although unlikely (where each servo demodulator is using a different nominal frequency), if both servo demodulators produce good SAM detections, then one SAM detection can be characterized as a best good SAM detection in order to determine the most likely location of the head 414 (and the appropriate frequency). Schemes for characterizing a SAM detection as a good SAM detection or a bad SAM detection, as well as schemes for selecting a best good SAM detection among multiple good SAM detections, are described in detail above.

In accordance with embodiments of the present invention discussed above, each servo demodulator determines actual servo demodulation values (e.g., a wedge number value, a track number value, a burst value and/or a position error signal) in order to determine whether a detection of the SAM pattern should be characterized as a good SAM detection or a bad SAM detection. As with embodiments of the present invention discussed above, these actual servo demodulation values associated with a good SAM detection (or a best good SAM detection) can then be used for servo control. Additionally, the location or detection time of the SAM pattern characterized as a good SAM detection can be used to predict where or when to search for the SAM pattern in a next servo wedge, as described above.

It is noted that first and second servo demodulators 404A, 404B, and the first and second paths 412A and 412B, need not include all of the same circuitry. Rather, it is possible that the servo demodulators 404A and 404B may share some of the same circuitry, or that one of the servo demodulators includes less circuitry than the other. Similarly, paths 412A and 412B may share some circuitry, or one may include less circuitry than the other.

It is further noted that there may be some difficulty in demodulating a servo wedge when a head is straddling a boundary between two zones, with half the head reading a zone recorded at one frequency and half the head reading another zone recorded at another frequency. At this point the servo wedge may be lost, and a track may be given up.

In each of the zone bit recorded servo wedge embodiments described above, if no SAM pattern is detected in a servo wedge, the servo demodulators can search for the SAM pattern again in the next servo wedge, using the same nominal frequencies. Alternatively (or after searching a few times using the same nominal frequencies), the nominal frequencies can be changed in order to determine if a head is over a different zone than predicted.

Further Embodiments with Multiple Servo Demodulators

In the embodiments of the present invention just described above, a pair of servo demodulators 404A and 404B, and a pair of paths 412A and 412B are used to determine which of the two most likely zones the head 414 is actually located. Such embodiments are most useful when the head 414 is near a boundary between two adjacent zones (or more specifically, when a zone bit recorded servo wedge that the head 414 is attempting to read is near the boundary between two adjacent zones). However, there will be occasions where there is high confidence as to which zone the head 414 is located, and thus, that there would be no need to search for a SAM pattern using two different nominal frequencies. For example, when the head 414 is deep within (e.g., near a center of) a zone at a first point in time, it is relatively easy from the microprocessor 410 to have high confidence that the head 414 will still be within the same zone at a second point in time, assuming the difference between times is relatively small. During such occasions, the disk drive device 1302 can use the extra servo demodulator 404B and path 412B for something other than searching for the SAM pattern at the nominal frequency associated with one of the adjacent zones. In other words, embodiments of the present invention make good use of the additional servo demodulation capability for those times when there is high confidence about which zone the head 414 is located. Such embodiments are now discussed below.

Each servo demodulator 404A and 404B (and corresponding read/write path 412A and 412B) can be thought of as using a set of servo demodulation parameters when searching for a SAM pattern. Such servo demodulation parameters can include channel control values, such as servo AGC and servo PLL values, which are discussed above. Servo AGC values can be gain values (e.g., starting values or update values), filter coefficient values, filter accumulation path values, etc., as mentioned above. A servo PLL value can be, for example, a starting PLL frequency value or a PLL update value. Other examples of servo demodulation parameters include, but are not limited to, bit-detection threshold, SAM confidence threshold and finite impulse response (FIR) filter coefficient values. A bit-detection threshold value specifies the threshold used to distinguish between a data "1" and a data "0". A SAM confidence threshold value specifies the threshold used to help characterize whether a detection of a SAM pattern should be characterized as a good or bad SAM detection. A confidence determination (e.g., that is compared to a SAM confidence threshold) can be based, for example, on the number of matched (or mis-matched) bits in a demodulated bit pattern. Another example of a servo demodulation parameter is the nominal frequency that is used to search for a SAM pattern.

Because each servo demodulator 404A and 404B (and corresponding read/write path 412A and 412B) can use its own set of servo demodulation parameters when searching for a SAM pattern, the set of servo demodulation parameters used by servo demodulator 404A and read/write path 412A can be different than the set of servo demodulation parameters used by servo demodulator 404B and read/write path 412B. That is, in accordance with an embodiment of the present invention, servo demodulator 404A searches for a SAM pattern using a first set of servo demodulation detection parameters, while servo demodulator 404B searches for the SAM pattern using a second set of servo demodulation parameters, where at least one servo demodulation parameter in the second set is different than a corresponding parameter in the first set. If one of the servo demodulators 404A, 404B detects the SAM pattern, the servo demodulator detecting the SAM determines at least one actual servo demodulation value corresponding to the detection of the SAM pattern and then the microprocessor 410 can use the actual servo demodulation value(s) associated with a SAM detection for servo control. In accordance with an embodiment of the present invention, the microprocessor 410 characterizes a detection of the SAM pattern as a good SAM detection or a bad SAM detection, as explained in detail above. The actual servo demodulation value(s) associated with a good SAM detection can then be used for servo control. If both servo demodulators 404A and 404B produce a good SAM detection, then the microprocessor 410 selects a best good SAM detection, as explained in detail above, and the actual servo demodulation value(s) corresponding to the best good SAM detection can then be used for servo control.

As just explained above, a pair of servo demodulators 404A and 404B are very useful where the servo wedges of a disk are zone bit recorded. However, embodiments of the present invention are also directed to disk drive devices that include two or more servo demodulators 404, whether or not the servo wedges are zone bit recorded. Additionally, even though the embodiments described above have focused on the inclusion and use of a pair of servo demodulators 404, embodiments of the present invention are also directed to disk drive devices that include more than two servo demodulators 404 and read/write paths 412. Benefits of using a plurality of servo demodulators include the ability to simultaneously demodulate a servo wedge using different servo demodulation parameters, thereby increasing the probability that a good SAM detection will occur, and thus, thereby improving servo-demodulation robustness.

Limiting Channel Control Values

Referring back to FIG. 5, it is likely that the inputs to the servo AGC 428 and/or the servo PLL 426 will be either the output of the flash A/D 516 or the output of the FIR filter 518. For example, when it is important that settling occur quickly (e.g., when reading a servo preamble), the output of the flash A/D 516 may be used. When quick settling is not an issue, the output of the FIR filter 518 may be preferable because the signal has been filtered. Additional details of an exemplary servo AGC 428 and an exemplary servo PLL 426 are shown in FIG. 14, which also shows the portions of path 412 that are likely to be part of a servo AGC loop and a servo PLL loop.

Figure 14:
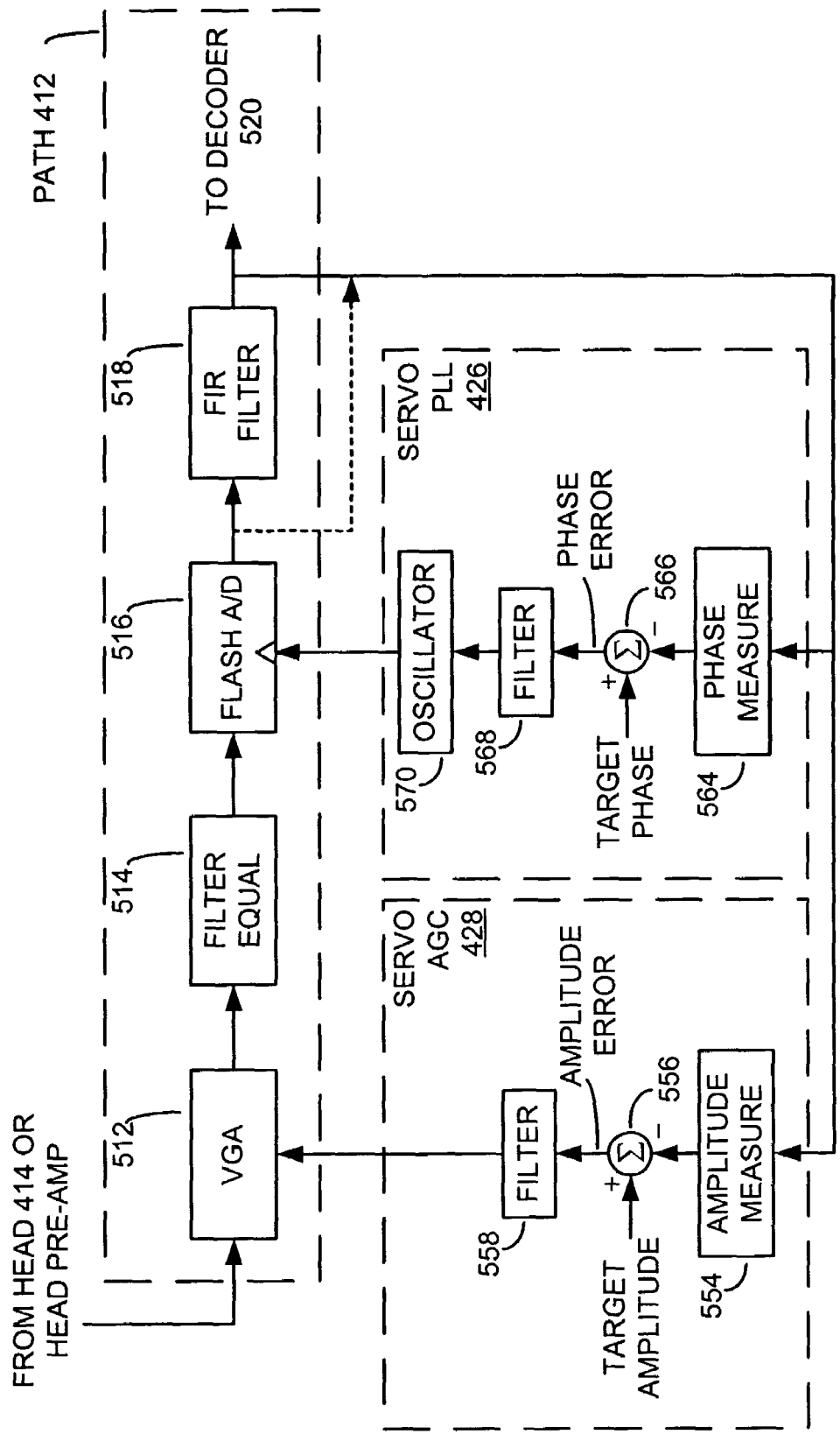
FIG. 14 is a diagram showing exemplary details of the servo AGC and servo PLL blocks shown in FIGS. 4 and 5.

Referring now to FIG. 14, the servo AGC 428 will likely include an amplitude measuring circuit 554 that measures the amplitude of the output from the flash A/D 516 (or the FIR filter 518). A signal representative of the measured amplitude is compared to a target amplitude, using for example, a summer 556, the output of which is an amplitude error signal. The amplitude error signal is provided to a filter 558, which is likely digital for ease and cost of implementation. The output of the filter 558 (which is the output of the servo AGC 428) is the AGC gain value provided to the VGA 512, which uses the AGC gain value to adjust its gain. Assuming, for example, that the output of the AGC 428 is an 8 bit word, then the input to the VGA 512 can have one of 256 different levels (e.g., 0 to 255, or −128 to 127, depending on whether the value a signed or unsigned variable). However, despite the range of possible AGC values, a more narrow range of values may be desirable. For example, the desired range of servo AGC gain values may be from 12 to 38, inclusive, with any values outside of that range being undesirable. Such a desired range can be determined, for example, during a characterization of a drive (e.g., that is performed in the factory).

In accordance with an embodiment of the present invention, one or more registers are used to store one or more range limits, allowing for only a subset of possible channel control values. A first register can store, for example, the lower or minimum AGC limit (e.g., 12), and a second register can store the upper or maximum AGC limit (e.g., 38). In this manner, the servo AGC 428 keeps the output of the read/write path 412 within a desired range, even when demodulated servo wedges 138 are corrupted and/or when servo demodulation fails for any other reason. In addition to controlling the range of servo AGC gain values, ranges of other servo AGC values such as filter accumulation paths, and the like, can be limited or clamped in a similar manner.

Figure 15:
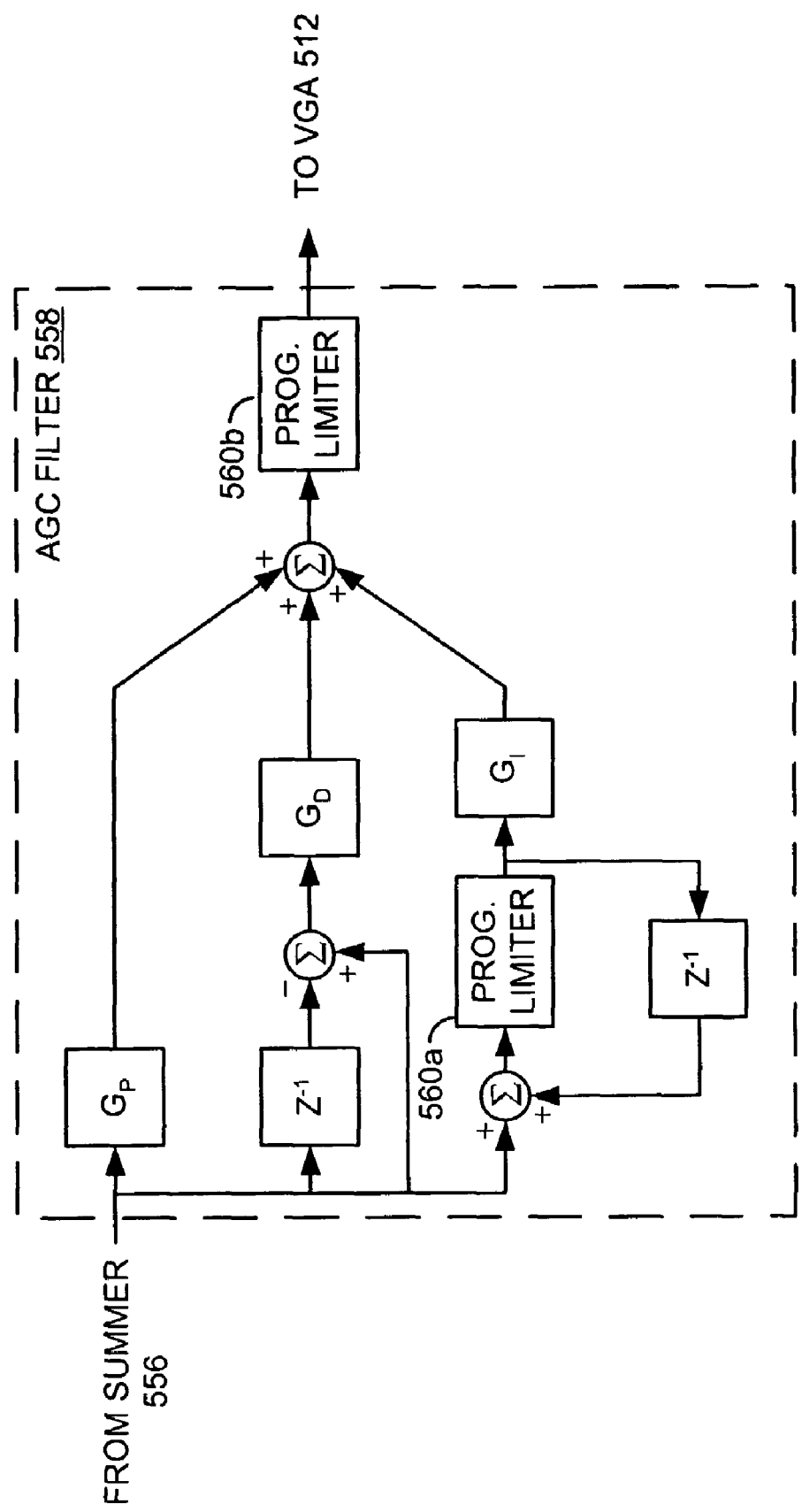
FIG. 15 is a diagram showing exemplary details of the AGC filter of FIG. 14.

In accordance with specific embodiments of the present invention, the servo AGC gain values are limited within and/or at the output of the AGC filter 558. Such embodiments will be described with reference to FIG. 15, which shows an exemplary implementation of the AGC filter 558. As shown in FIG. 15, the AGC filter 558 can be implemented, for example, using a Proportional, Integral, Differential (PID) controller whose output is related to its input by a proportional gain, an integral gain and a differential gain. The exemplary PID controller includes a proportional path (shown as the upper path), an integral path (shown as the lower path), and a differential path (shown as the middle path). The $G_P$, $G_I$ and $G_D$ blocks represent the gains associated with each path. The $Z^{-1}$ blocks represent delay elements. The just described portions of a PID controller are typical. However, what is not typical is the use of a programable limiter 560a within the integral path of the controller and/or the use of a programable limiter 560b at the output of the controller. The details of the AGC filter 558 as a PID controller are shown as an exemplary implementation that is not meant to be limiting. For example, the AGC filter may be implemented using only an integral controller (e.g., which only includes the lower path shown in FIG. 15). Further, the integral gain block $G_I$, for example, can be located prior to the summer in the integral path. To prevent integral windup, it is desirable to include the programable limiter 560a within the integral path. Additionally, to accurately limit the actual servo AGC gain values (which can collectively be referred to as a servo AGC signal) provided to the VGA 512, it is also desirable to have a programable limiter 560b at the output of the AGC filter 558 (within or external to the AGC filter 558). Although each limiter 560a and 560b can be implemented in a similar manner, it is likely that each will include its own limits. An exemplary implementation of a programable limiter 560 will now be described with reference to FIG. 16.

Figure 16:
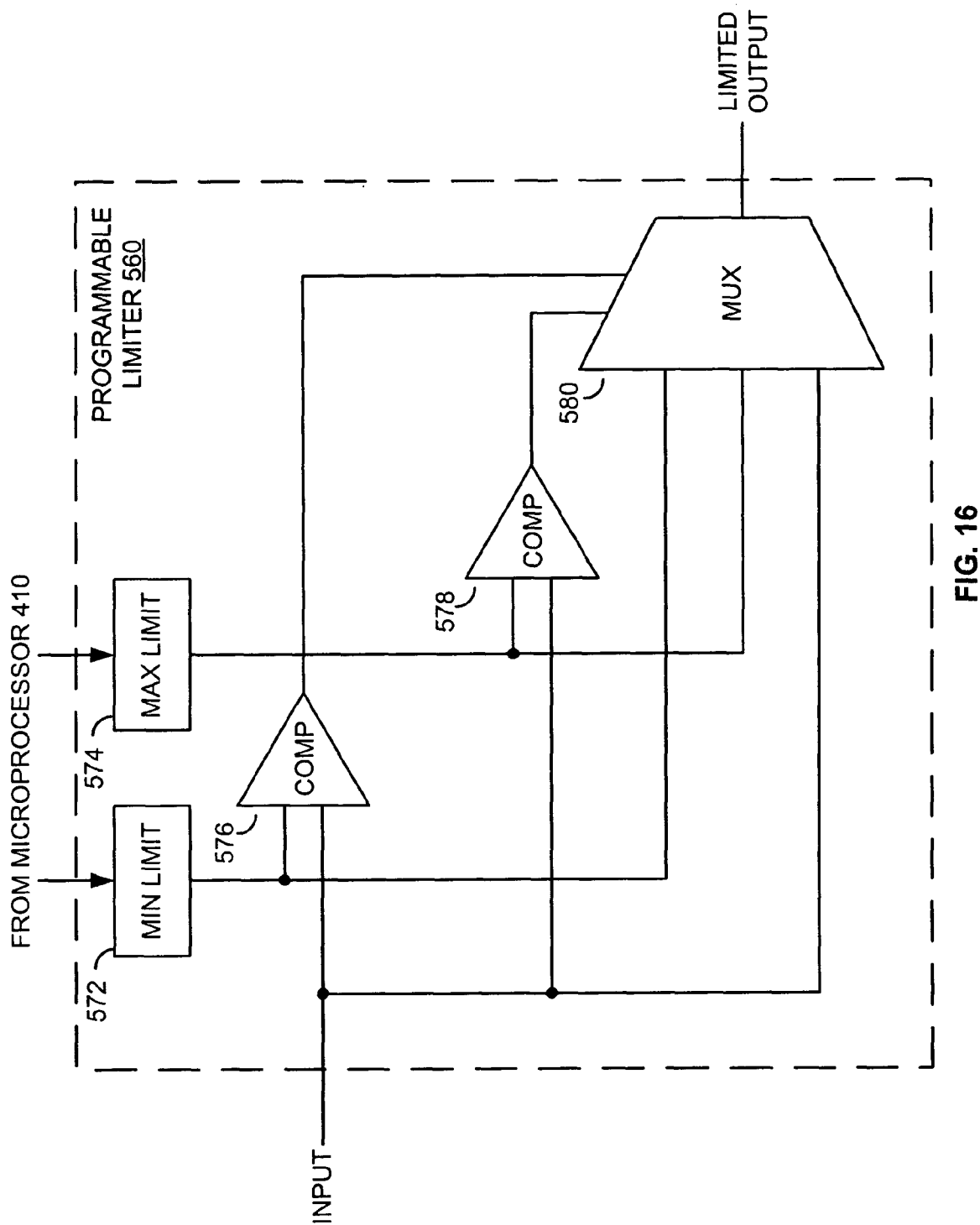
FIG. 16 is a diagram showing exemplary details of the programmable limiter of FIG. 15, in accordance with an embodiment of the present invention.

Referring to FIG. 16, the programable limiter 560 is shown as including a register 572 that stores a lower or minimum limit value, and a register 574 that stores an upper or maximum limit value. As shown, the registers 572 and 574 receive their contents from microprocessor 410. The programable limiter 560 receives an input value and either outputs the input value, the minimum value or the maximum value. In the exemplary implementation shown, this is achieved using a multiplexer 580 and comparators 576 and 578. The comparator 576 compares the input to the minimum value (stored in register 572) and produces an output that informs the multiplexer 580 whether or not the input is less than the minimum value. The comparator 578 compares the input to the maximum value stored in register 574, and produces an output that informs the multiplexer 580 whether or not the input is greater than the maximum value. In other words, the select or control lines of the multiplexor 580 receive the outputs of the comparators 576 and 578. The multiplexer also receives the input signal, the minimum value, and the maximum value, as shown. Based on the select or control inputs (i.e., the outputs of the comparators 576 and 578), the multiplexer: outputs the input signal if the input is within the range specified by the maximum and minimum values (stored in registers 572 and 574); outputs the minimum value if the input is less than the minimum value; or outputs the maximum value if the input is greater than the maximum value. This is an exemplary implementation of a programable limiter. One of ordinary skill in the art would appreciate from this disclosure how to implement equivalent programable limiters that are within the spirit and scope of the present invention.

In accordance with embodiments of the present invention, limits on channel control values (e.g., servo AGC values) can change from head to head. Additionally or alternatively, limits on channel control values can change depending on the radial position being read (e.g., from zone to zone). Such limits for each head and/or each zone can be determined, for example, during self test performed at the factory or during design. Limit values for each head and/or zone (or combinations thereof) can be stored in a location accessible to the microprocessor. The microprocessor 410 can update the limit values (e.g., the values stored in registers 572 and 574) associated with each programable limiter based on which head is being used to read and/or based on which zone is being read.

Embodiments of the present invention are also directed to limiting servo PLL values that are used to adjust the frequency of an oscillator. Referring back to FIG. 14, the servo PLL 426 will likely include a phase measuring circuit 564 that measures the phase of the output from the flash A/D 516 (or the FIR filter 518). A signal representative of the measured phase is compared to a target phase, using for example, a summer 566, the output of which is a phase error signal. The phase error signal is provided to a filter 568, which is likely digital for ease of implementation. The output of the filter 568, which is a PLL update value, is provided to an oscillator 568 and in effect instructs the oscillator to increase or decrease in frequency by a certain amount. The oscillator can be, for example, a digital oscillator or a voltage controlled oscillator (VCO). A digital oscillator can include, for example, a phase interpolator, such as disclosed in U.S. Pat. No. 6,525,615, entitled "Oscillator with Digitally Variable Phase for a Phase-Locked Loop," which is incorporated by reference herein. If the filter 568 is a digital filter outputting a digital PLL update value and the oscillator is a VCO, then a digital to analog converter can be used to convert the output of the filter to an analog value acceptable by the VCO. In a similar manner to that discussed above, one or more programable limiters 560 can be used to limit the frequency range of the oscillator 570. For example, a programable limiter can be placed within an integration path of the filter 568 (to prevent integral windup) and/or at an output of filter 568 (to control the frequency range of the oscillator 570).

Figure 17:
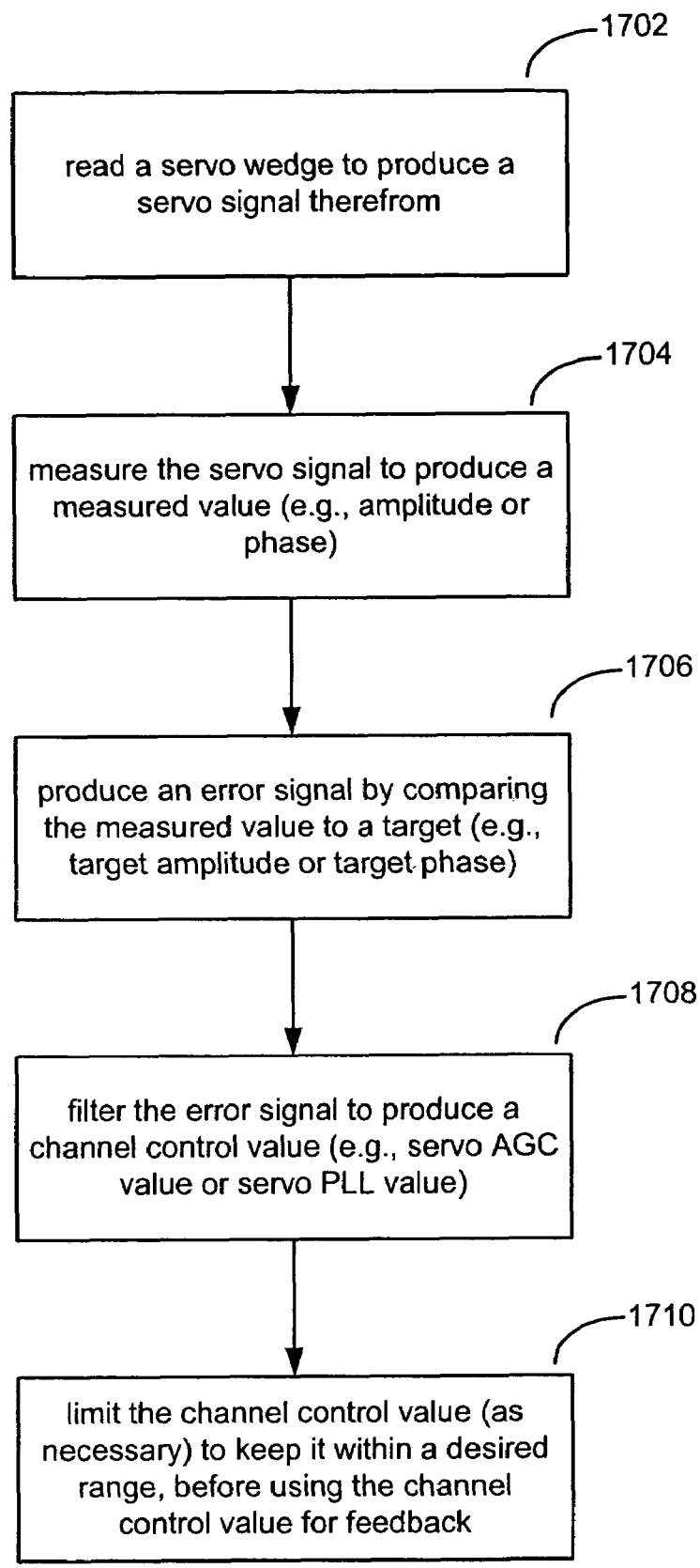
FIG. 17 is a high level flow diagram useful for describing embodiments of the present invention where channel control values are limited to a desired range.

The above described embodiments for limiting channel control values, such as servo AGC and servo PLL values, will now be summarized with reference to the high level flow diagram of FIG. 17. At a step 1702, a servo wedge is read to produce a servo signal. The servo signal is measured at a step 1704 to produce a measured value (e.g., an amplitude value or a phase value). At a step 1706, an error signal (e.g., an amplitude or phase error signal) is produced by comparing the measured value to a target (e.g., a target amplitude or a target phase). The error signal is filtered at a step 1708 to produce a channel control value (e.g., a servo AGC value or servo PLL value). As explained above, during the filtering, a programable limiter may be included in an integration path of the filter in order to prevent integral windup, which is undesirable. At a step 1710, the channel control value is limited (when necessary) to keep it within a desired range (e.g., between an upper and lower limit, inclusive), before such value is used for feedback control. For example, the channel control value will be limited such that it does not exceed an upper limit or fall below a lower limit.

In the embodiments shown above, the programable limiters 560 were described as being associated with a maximum limit and a minimum limit. However, it is also possible to only have one of a programmed lower limit or a programmed upper limit.

In accordance with embodiments of the present invention, firmware can be used to limit channel control values. As explained above, servo AGC and/or PLL values can be stored in registers or memory so that values determined while reading one servo wedge 138 can be used as the starting values for reading a next servo wedge 138. When a servo wedge 138 is corrupted, it is possible that the servo AGC and servo PLL values determined for that servo wedge 138 will be well outside a desired range (e.g., for a specific head and/or a specific zone). For example, if the servo wedge 138 was DC erased, the servo AGC 428 may over amplify a very low amplitude servo signal, and may even saturate itself and/or the VGA 512. Similarly, if the servo wedge 138 has been essentially erased, or is absent due to a media defect on the disk 110, the servo PLL 426 may become erratic while attempting to lock to a corrupt servo signal. Thus, if for whatever reason the values determined for servo AGC and servo PLL, during that servo wedge, are garbage, and these garbage values are used as starting values when the next servo wedge 138 is read, it is likely that it will take at least the entire next servo wedge 138 for the servo AGC 428 and the servo PLL 426 to recover (e.g., because the servo AGC 428 is saturated and the servo PLL 426 is erratic), causing, for example, the SAM in the next servo wedge 138 to be missed. This in turn can cause the servo demodulator 404 to completely lose lock. When this occurs, the whole concept, of having what is learned from one servo wedge influencing how a next wedge is read, backfires.

In accordance with embodiments of the present invention, after each servo wedge is read, and the servo AGC and servo PLL values are stored for that wedge, the microprocessor 410 will check the stored servo AGC and/or servo PLL values to see if they are within corresponding desired ranges. If a stored value is outside its corresponding range, it can be replaced with a more appropriate value. For example, if the stored servo AGC value (for use during the next servo wedge) is above predetermined maximum, the microprocessor 410 can replace it with a maximum limit known to the firmware. Similarly, if the stored servo AGC value is below a predetermined minimum, the microprocessor 410 can replace it with a known minimum limit. Alternatively, if the stored servo AGC value is outside the desired range, the servo AGC value determined for a previous wedge (were the servo AGC value was within the desired range) can be used to replace the stored AGC value that is to be used for the next servo wedge. In still another embodiment, each time the stored AGC value that is to be used for a next servo wedge is outside a desired range, it can be replaced by a predetermined value within the range (e.g., near the middle of the range). Firmware can similarly be used to limit other channel control values (e.g., servo PLL values) that are stored for the purpose of being used when reading a next servo wedge.

Figure 18:
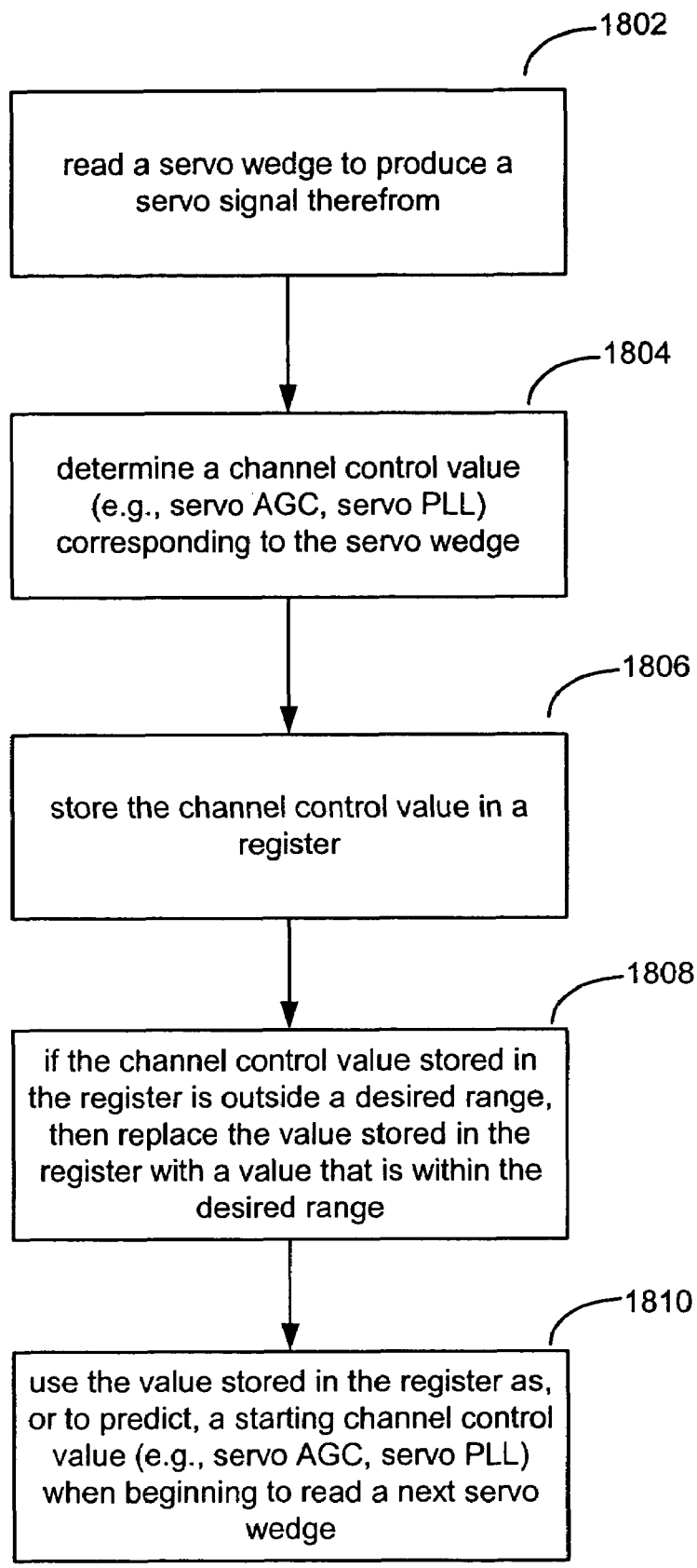
FIG. 18 is a high level flow diagram useful for describing embodiments of the present invention where firmware is used to limit channel control values to a desired range.

Embodiments in which firmware is used to limit channel control values will now be summarized with reference to the high level flow diagram of FIG. 18. At a step 1802, a servo wedge is read to produce a servo signal. At a step 1804, a channel control value (e.g., servo AGC or servo PLL value) corresponding to the servo wedge is determined. The channel control value is stored in an appropriate register, at a step 1806. At a step 1808, if the channel control value stored in the register is outside a desired range, then the value in the register will be replaced with a value that is within the desired range. For example, if the value in the register is above an upper limit of the range, the value in the register will be replaced with the upper limit value. Similarly, if the value in the register is below the lower limit of the range, the value in the register will be replaced with the lower limit. The value stored in the register (i.e., either the value stored in step 1806, or the replacement value stored in step 1808) is then used as, or to predict, a starting channel control value when beginning to read a next servo wedge.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the claimed invention.

The breadth and scope of the present invention should not be limited by any of the above-described exemplary embodiments, but should be defined only in accordance with the following claims and their equivalents.

What is claimed:

1. A method for improving servo demodulation robustness in a disk drive system having a read channel including a variable gain amplifier (VGA), the method comprising:
   (a) producing an amplitude error signal by comparing a measured servo signal amplitude to a target amplitude;
   (b) filtering the amplitude error signal to produce an automatic gain control (AGC) signal useful as feedback to the variable gain amplifier (VGA) of the read channel; and
   (c) limiting the AGC signal to keep it within a desired range, before providing the AGC signal as an input to the VGA;
   wherein the desired range includes at least one of an upper limit and a lower limit.

2. The method of claim 1, further comprising, prior to step (a): reading a servo wedge and producing a servo signal therefrom; and measuring an amplitude of the servo signal.

3. The method of claim 1, wherein the disk drive system includes a plurality of heads, and wherein the desired range is dependent at least in part on which head is being used to read a servo wedge.

4. The method of claim 1, wherein the disk drive system includes a zone bit recorded disk including a plurality of zones, and wherein the desired range is dependent at least in part on which zone is being read.

5. The method of claim 1, wherein the desired range is dependent at least in part am
   which head, of a plurality of heads, is being used to read a servo wedge; and
   which zone, of a plurality of zones, the servo wedge is within.

6. The method of claim 1, wherein step (c) includes limiting an output path of the digital filter to keep the servo AGC signal within the desired range.

7. A method for improving servo demodulation robustness in a disk drive system having a read channel including a variable gain amplifier (VGA), the method comprising:
   (a) producing an amplitude error signal by comparing a measured servo signal amplitude to a target amplitude;
   (b) filtering the amplitude error signal to produce an automatic gain control (AGC) signal useful as feedback to the variable gain amplifier (VGA) of the read channel; and
   (c) limiting the AGC signal to keep it within a desired range, before providing the AGC signal as an input to the VGA;
   wherein step (b) includes
      (b.1) filtering the amplitude error signal using a digital filter including an integration path; and
      (b.2) limiting the integration path within the digital filter to thereby prevent integral windup.

8. A method for improving servo demodulation robustness in a disk drive system having a read channel including a variable gain amplifier (VGA), the method comprising:
   (a) producing an amplitude error signal by comparing a measured servo signal amplitude to a target amplitude;
   (b) filtering the amplitude error signal to produce an automatic gain control (AGC) signal useful as feedback to the variable gain amplifier (VGA) of the read channel; and
   (c) limiting the AGC signal to keep it within a desired range, before providing the AGC signal as an input to the VGA;
   wherein step (c) includes
      (c.1) comparing each servo automatic gain control (AGC) value, of the servo AGC signal, to an upper limit and a lower limit;
      (c.2) if the servo AGC value is above the upper limit, limiting the servo AGC value to the upper limit; and
      (c.3) if the servo AGC value is below the lower limit, limiting the servo AGC value to the lower limit.

9. A method for improving servo demodulation robustness, comprising:
   (a) comparing a servo automatic gain control (AGC) value to an upper limit and a lower limit;
   (b) if the servo AGC value is above the upper limit, limiting the servo AGC value to the upper limit; and
   (c) if the servo AGC value is below the lower limit, limiting the servo AGC value to the lower limit.

10. A method for improving servo demodulation robustness in a disk drive system having a read channel, the method comprising:
   (a) producing a phase error signal by comparing a measured servo signal phase to a target phase;
   (b) filtering the phase error signal to produce a servo phase lock loop (PLL) signal useful as feedback to an oscillator; and
   (c) limiting the PLL signal to keep it within a desired range, before providing the PLL signal as an input to the oscillator;
   wherein the desired range includes at least one of an upper limit and a lower limit.

11. The method of claim 10, further comprising, prior to step (a):
   reading a servo wedge and producing a servo signal therefrom; and measuring a phase of the servo signal.

12. The method of claim 10, wherein the disk chive system includes a plurality of heads, and wherein the desired range is dependent at least in part on which head is being used to read a servo wedge.

13. The method of claim 10, wherein the disk drive system includes a zone bit recorded disk including a plurality of zones, and wherein the desired range is dependent at least in part on which zone is being read.

14. The method of claim 10, wherein the desired range is dependent at least in part on:
   which head, of a plurality of heads, is being used to read a servo wedge; and
   which zone, of a plurality of zones, the servo wedge is within.

15. The method of claim 10, wherein step (c) includes limiting an output path of the digital filter to keep the servo PLL signal within the desired range.

16. A method for improving servo demodulation robustness in a disk drive system having a read channel, the method comprising:
   (a) producing a phase error signal by comparing a measured servo signal phase to a target phase;
   (b) filtering the phase error signal to produce a servo phase lock loop (PLL) signal useful as feedback to an oscillator; and
   (c) limiting the PLL signal to keep it within a desired range, before providing the PLL signal as an input to the oscillator;
   wherein step (b) includes
      (b.1) filtering the PLL signal using a digital filter including an integration path; and
      (b.2) limiting the integration path within the digital filter to thereby prevent integral windup.

17. A method for improving servo demodulation robustness in a disk drive system having a read channel, the method comprising:
   (a) producing a phase error signal by comparing a measured servo signal phase to a target phase;
   (b) filtering the phase error signal to produce a servo phase lock loop (PLL) signal useful as feedback to an oscillator, and
   (c) limiting the PLL signal to keep it within a desired range, before providing the PLL signal as an input to the oscillator;
   wherein step (c) includes
      (c.1) comparing each servo PLL value, of the servo PLL signal, to an upper limit and a lower limit;
      (c.2) if the servo PLL value is above the upper limit, limiting the servo PLL value to the upper limit; and
      (c.3) if the servo PLL value is below the lower limit, limiting the servo PLL value to the lower limit.

18. A method for improving servo demodulation robustness, comprising:
   (a) comparing a servo phase lock loop (PLL) value to an upper limit and a lower limit;
   (b) if the servo PLL value is above the upper limit limiting the servo PLL value to the upper limit; and
   (c) if the servo PLL value is below the lower limit, limiting the servo PLL value to the lower limit.

19. A method for improving servo-demodulation robustness, comprising:
   (a) reading a servo wedge;
   (b) determining a servo automatic gain control (AGC) value corresponding to the servo wedge;
   (c) storing the servo AGC value in a register;
   (d) if the servo AGC value stored in the register is outside a desired range, replacing the servo AGC value stored in the register with a value that is within the desired range; and
   (e) using the servo AGC value stored in the register as, or to predict, a starting AGC value when beginning to read a next servo wedge.

20. The method of claim 19, wherein the desired range includes an upper limit value and a lower limit value, and wherein step (d) comprises:
   (d.1) comparing the servo AGC value stored in the register to the upper limit value and to the lower limit value;
   (d.2) if the servo AGC value is above the upper limit value, replacing the servo AGC value stored in the register with the upper limit value; and
   (d.3) if the servo AGC value is below the lower limit value, replacing the servo AGC value stored in the register with the lower limit value.

21. The method of claim 19, wherein the disk drive system includes a plurality of heads, and wherein the upper limit value and the lower limit value is dependent at least in part on which head is being used to read a servo wedge.

22. The method of claim 19, wherein the disk drive system includes a zone bit recorded disk including a plurality of zones, and wherein the upper limit value and the lower limit value is dependent at least in part on which zone is being read.

23. The method of claim 19, wherein the upper limit value and the lower limit value are dependent at least in part on:
   which head, of a plurality of heads, is being used to read a servo wedge; and
   which zone, of a plurality of zones, the servo wedge is within.

24. A method for improving servo-demodulation robustness, comprising:
   (a) reading a servo wedge;
   (b) determining a servo phase lock loop (PLL) value corresponding to the servo wedge;
   (c) storing the servo PLL value in a register,
   (d) if the servo PLL value stored in the register is outside a desired range, replacing the servo PLL value stored in the register with a value that is within the desired range; and
   (e) using the servo PLL value stored in the register as, or to predict, a starting servo PLL value when beginning to read a next servo wedge.

25. The method of claim 24, wherein the desired range includes an upper limit value and a lower limit value, and wherein step (d) comprises:
   (d.1) comparing the servo PLL value stored in the register to the upper limit value and to the lower limit value;
   (d.2) if the servo PLL value is above the upper limit value, replacing the servo PLL value stored in the register with the upper limit value; and
   (d.3) if the servo PLL value is below the lower limit value, replacing the servo PLL value stored in the register with the lower limit value.

26. The method of claim 25, wherein the disk drive system includes a plurality of heads, and wherein the upper limit value and the lower limit value is dependent at least in part on which head is being used to read a servo wedge.

27. The method of claim 25, wherein the disk drive system includes a zone bit recorded disk including a plurality of zones, and wherein the upper limit value and the lower limit value is dependent at least in part on which zone is being read.

28. The method of claim 25, wherein the upper limit value and the lower limit value are dependent at least in part on:
   which head, of a plurality of heads, is being used to read a servo wedge; and
   which zone, of a plurality of zones, the servo wedge is within.

* * * * *

UNITED STATES PATENT AND TRADEMARK OFFICE
CERTIFICATE OF CORRECTION

PATENT NO. : 6,992,855 B2
DATED : January 31, 2006
INVENTOR(S) : Richard M. Ehrlich It is certified that error appears in the above-identified patent and that said Letters Patent is hereby corrected as shown below:

Column 31,
Line 63, replace "am" with -- on: --;

Column 32,
Line 64, replace "chive" with -- drive --.

Signed and Sealed this

Second Day of May, 2006

JON W. DUDAS
*Director of the United States Patent and Trademark Office*